*INVENTORS*
FREDERICK A. SHULTZ
FLOYD C. GRESSEL
GUSTAV H. KROEGER
OSCAR J. HOBB
BY *John L. Sterling*
ATTORNEY March 18, 1952  F. A. SHULTZ ET AL  2,590,047
COMBINED TABULATOR AND SUMMARY PUNCH
Filed Aug. 23, 1950  14 Sheets-Sheet 3

INVENTORS
FEDERICK A. SHULTZ
FLOYD C. GRESSEL
GUSTAV H. KROEGER
OSCAR J. HOBB
BY
ATTORNEY

INVENTORS
FREDERIC A. SHULTZ
FLOYD C. GRESSEL
GUSTAV H. KROEGER
OSCAR J. HOBB

BY
ATTORNEY

March 18, 1952  F. A. SHULTZ ET AL  2,590,047
COMBINED TABULATOR AND SUMMARY PUNCH
Filed Aug. 23, 1950  14 Sheets-Sheet 6
FIG. 7
FIG. 8
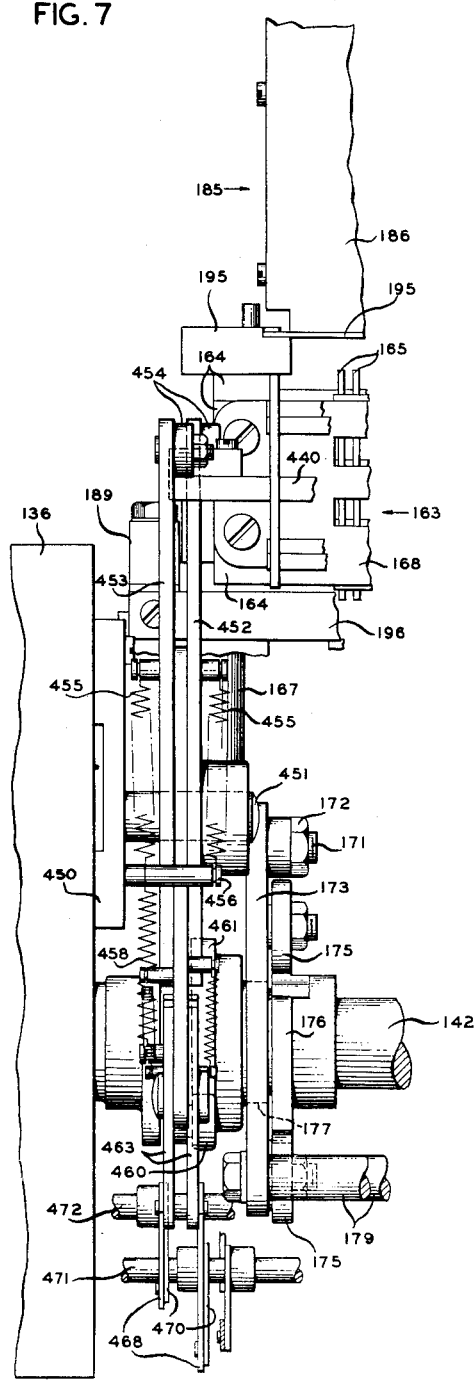
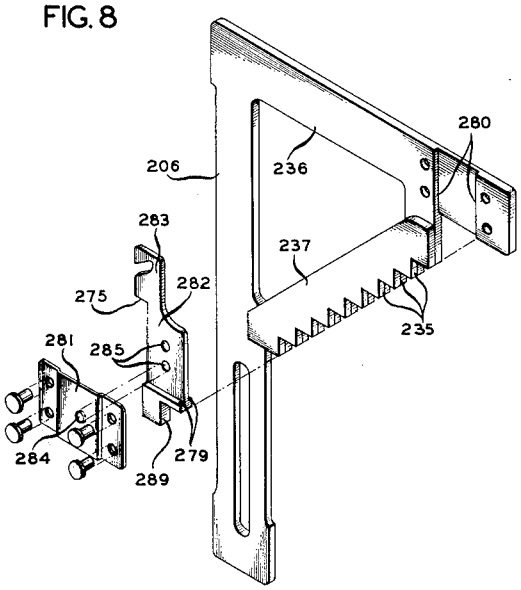
*INVENTORS*
FREDERICK A. SHULTZ
FLOYD C. GRESSEL
GUSTAV H. KROEGER
OSCAR J. HOBB
BY
ATTORNEY March 18, 1952  F. A. SHULTZ ET AL  2,590,047
COMBINED TABULATOR AND SUMMARY PUNCH
Filed Aug. 23, 1950  14 Sheets-Sheet 7

INVENTORS
FREDERICK A. SHULTZ
FLOYD C. GRESSEL
GUSTAV H. KROEGER
OSCAR J. HOBB
BY
ATTORNEY

INVENTORS
FREDERICK A. SHULTZ
FLOYD C. GRESSEL
GUSTAV H. KROEGER
OSCAR J. HOBB
BY
ATTORNEY

March 18, 1952  F. A. SHULTZ ET AL  2,590,047
COMBINED TABULATOR AND SUMMARY PUNCH
Filed Aug. 23, 1950  14 Sheets-Sheet 11
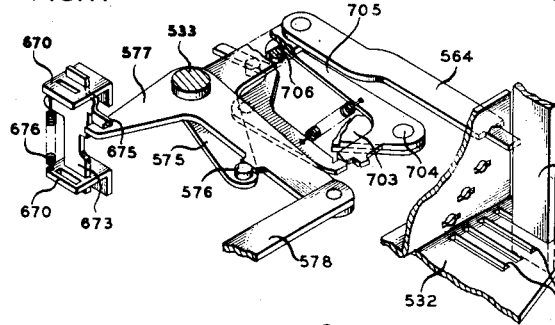
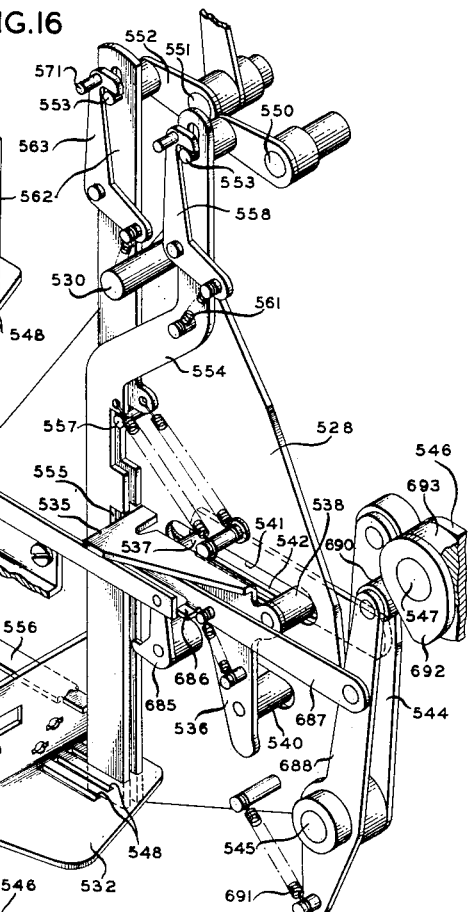
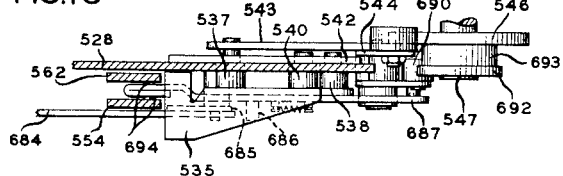
*INVENTORS*
FREDERICK A. SHULTZ
FLOYD C. GRESSEL
GUSTAV H. KROEGER
OSCAR J. HOBB
BY
ATTORNEY March 18, 1952 F. A. SHULTZ ET AL 2,590,047
COMBINED TABULATOR AND SUMMARY PUNCH
Filed Aug. 23, 1950 14 Sheets-Sheet 12
FIG. 19
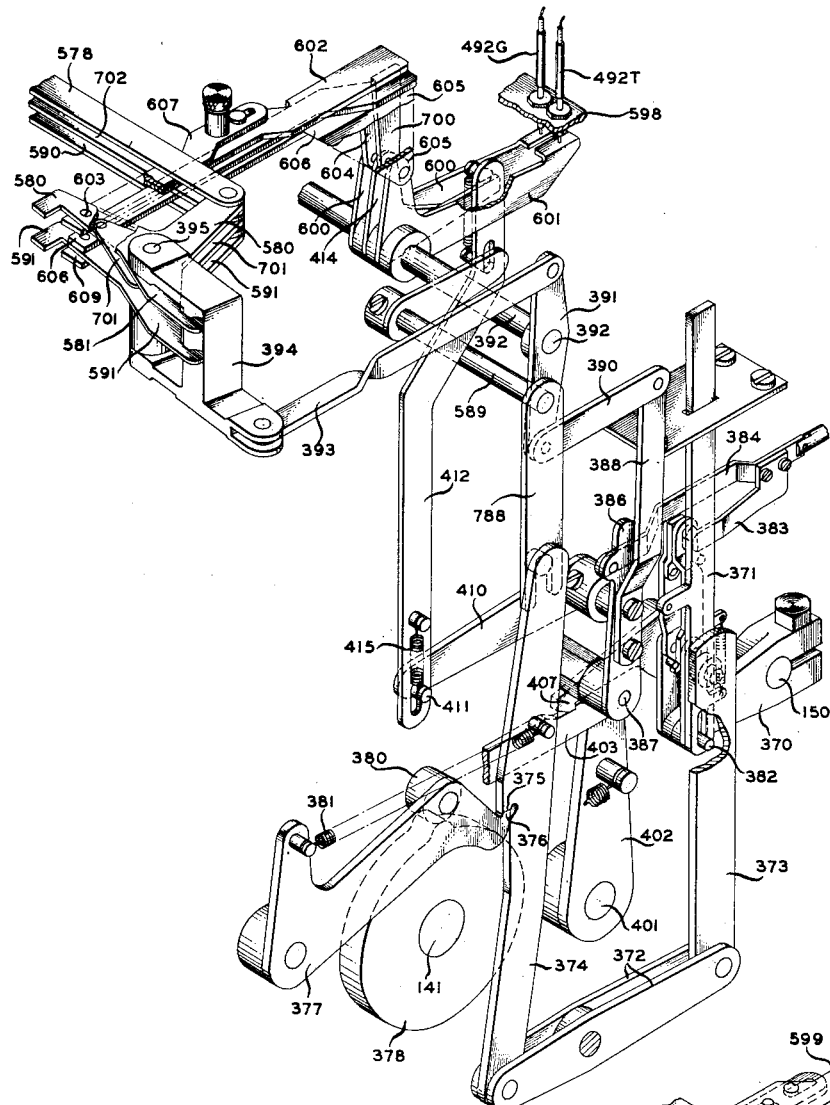
FIG. 20
FIG. 21
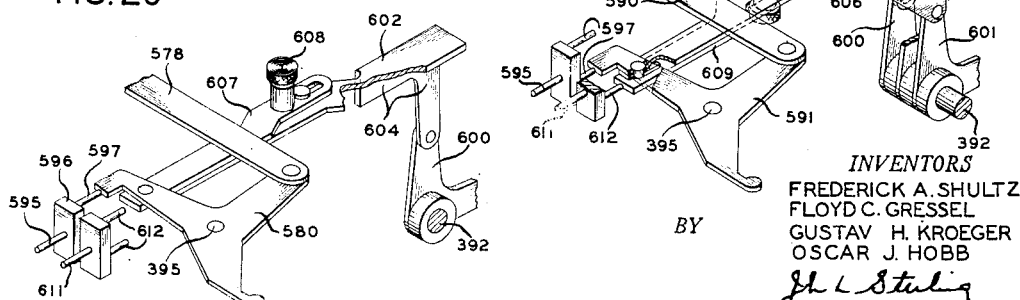
INVENTORS
FREDERICK A. SHULTZ
FLOYD C. GRESSEL
GUSTAV H. KROEGER
OSCAR J. HOBB
BY
ATTORNEY March 18, 1952 F. A. SHULTZ ET AL 2,590,047
COMBINED TABULATOR AND SUMMARY PUNCH
Filed Aug. 23, 1950 14 Sheets-Sheet 13

Inventors
FREDERICK A. SHULTZ
FLOYD C. GRESSEL
GUSTAV H. KROEGER
OSCAR J. HOBB

By

Attorney

March 18, 1952 F. A. SHULTZ ET AL 2,590,047
COMBINED TABULATOR AND SUMMARY PUNCH
Filed Aug. 23, 1950 14 Sheets-Sheet 14
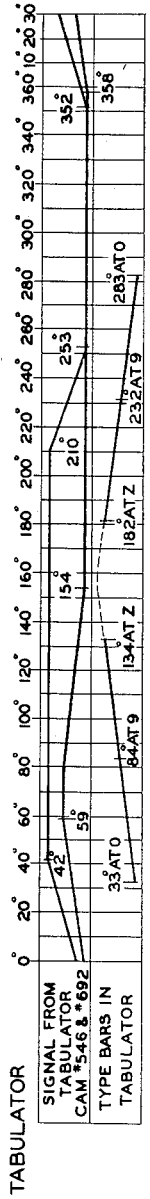
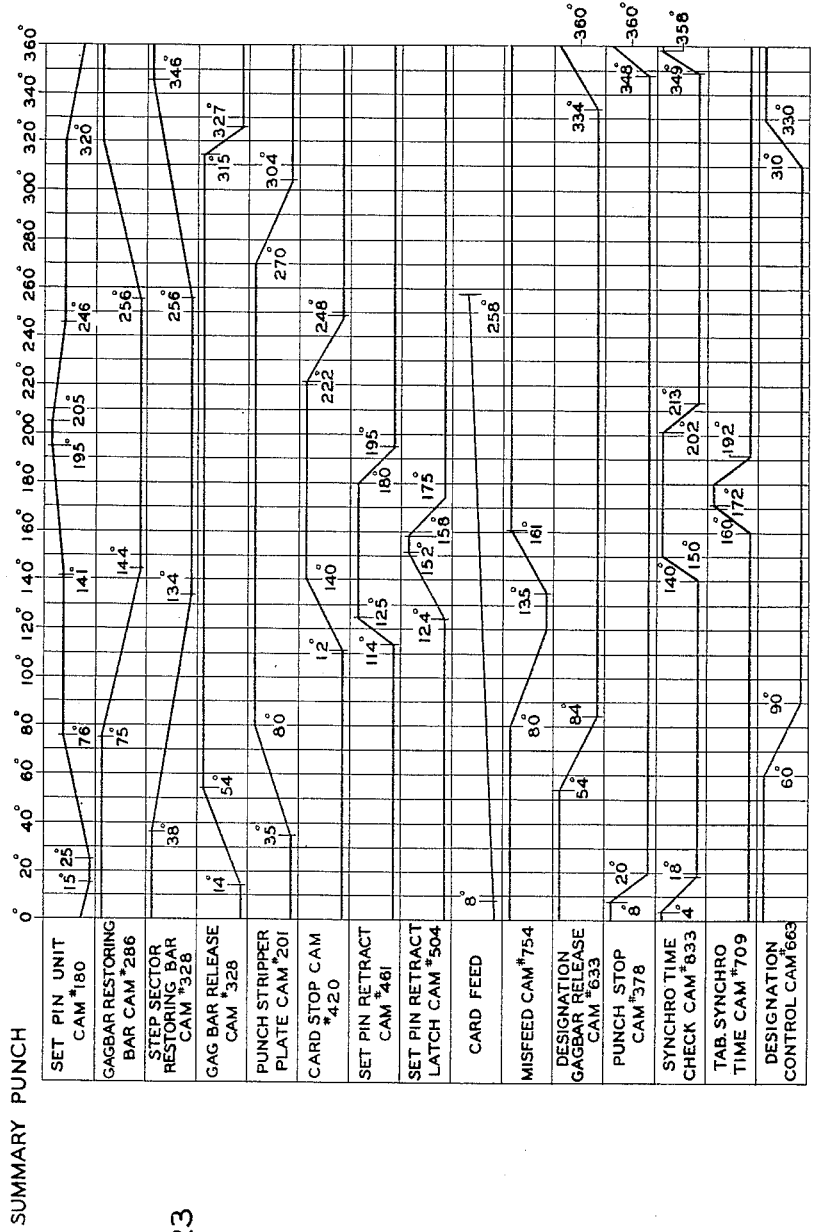
FIG. 23
INVENTORS
FREDERICK A. SHULTZ
FLOYD C. GRESSEL
GUSTAV H. KROEGER
OSCAR J. HOBB
BY
ATTORNEY Patented Mar. 18, 1952

2,590,047

UNITED STATES PATENT OFFICE 2,590,047

COMBINED TABULATOR AND SUMMARY PUNCH

Frederick A. Shultz, Herkimer, Floyd C. Gressel, Ilion, and Oscar J. Hobb, Little Falls, N. Y., and Gustav H. Kroeger, Cincinnati, Ohio, assignors to Remington Rand Inc., New York, N. Y., a corporation of Delaware Application August 23, 1950, Serial No. 181,058

32 Claims. (Cl. 235—61.1)

This invention relates to a combined summary punch and tabulator, although some of its features are applicable to other types of statistical or accounting machines. The invention is shown as applied to a combined summary punch and tabulator such as that disclosed in the patent to Frank A. Lopez, No. 2,512,865 dated June 27, 1950, the patent to John Mueller, No. 2,580,693, issued January 1, 1952, and as so applied, consists chiefly in improvements on and additions to that machine.

The primary purpose of a combined summary punch and tabulator is to provide a punched card record of each total and/or grand total accumulated in the tabulator. To identify the total or grand total certain designatory information is also punched in each card.

In the combined summary punch and tabulator to which the present invention is shown applied, the total and grand total are printed from certain type bars on total and grand total cycles, respectively, and the designation usually is printed from other type bars on the first cycle following the total or grand total cycle as the case may be. The information to be punched is set up in normally locked gag bars, from which it is transferred to lockable set pins which, at the appropriate time, push punches through a card. One group of gag bars is utilized for the total and the grand total and another group for the designations.

In general, the object of the invention is to improve the punch set up means and the gag bar releasing means, and to provide novel punch storage means and also means for synchronizing the operations of the punch and the tabulator.

More particularly, one object of the invention is the provision of simplified and more durable means under control of the tabulator of the tabulator bars for accurately locating the gag bars in their set positions. This means includes step sectors set in accordance with the advance of the type bars and against which the gag bars limit.

Another object of the invention is the provision of settable means associated with each step sector for preventing the setting of the associated gag bar to zero position. This means consists of an interponent mounted on the step sector and settable to block advance of the gag bar when the step sector is in zero position.

Another object of the invention is the provision of novel means for storing data set up on the gag bars on one cycle until a later cycle on which said data is to be punched in card, or until a still later cycle to permit of punching the data in a plurality of cards. This means consists of a plurality of normally disabled retract bars each for unlocking selected ones of the set pins, and means controlled by the tabulator for enabling and operating said bars selectively.

A further object of the invention is the provision of means set into operation on one cycle of the punch for controlling the release of the gag bars appropriate to the designation, only on that later cycle during which the designation is printed in the tabulator. This means includes an interponent through which the releasing means is actuated, a latch normally holding the interponent in ineffective position but tripped under control of the tabulator, other means controlled by the tabulator for temporarily restoring the interponent to ineffective position, and timed means to actuate the releasing means through said interponent.

Still further object of the invention is the provision of means for stopping both machines in the event that they become dissynchronized in their operation. This means includes a member operable to stop both machines, and a timed actuator in each machine, one to operate said member and the other to prevent operation of the member.

Other objects and structural details of the invention will be apparent from the following description when read in connection with the accompanying drawing, wherein Fig. 1 is a front to rear sectional view of the middle portion of the tabulator;

Fig. 7 is a fragmentary rear view of the right hand rear corner of the base of the punch;

Fig. 8 is an exploded perspective view of a step sector which is shown face view in Fig. 6;

Fig. 16 is a perspective view of the punch control unit situated on the left hand side of the tabulator;

Fig. 17 is a fragmentary perspective view of a portion of said control unit that is sectioned away in Fig. 16;

Fig. 18 is a plan sectional view of the control unit actuator;

Fig. 19 is a perspective view from above and to the rear of control mechanism located on the left hand side of the punch;

Fig. 20 is a perspective view of portion of the mechanism shown in Fig. 19 but partially obscured;

Fig. 21 is a perspective view of another portion of the mechanism shown in Fig. 19 but partially obscured;

Fig. 23 is the time chart.

Figure 1:
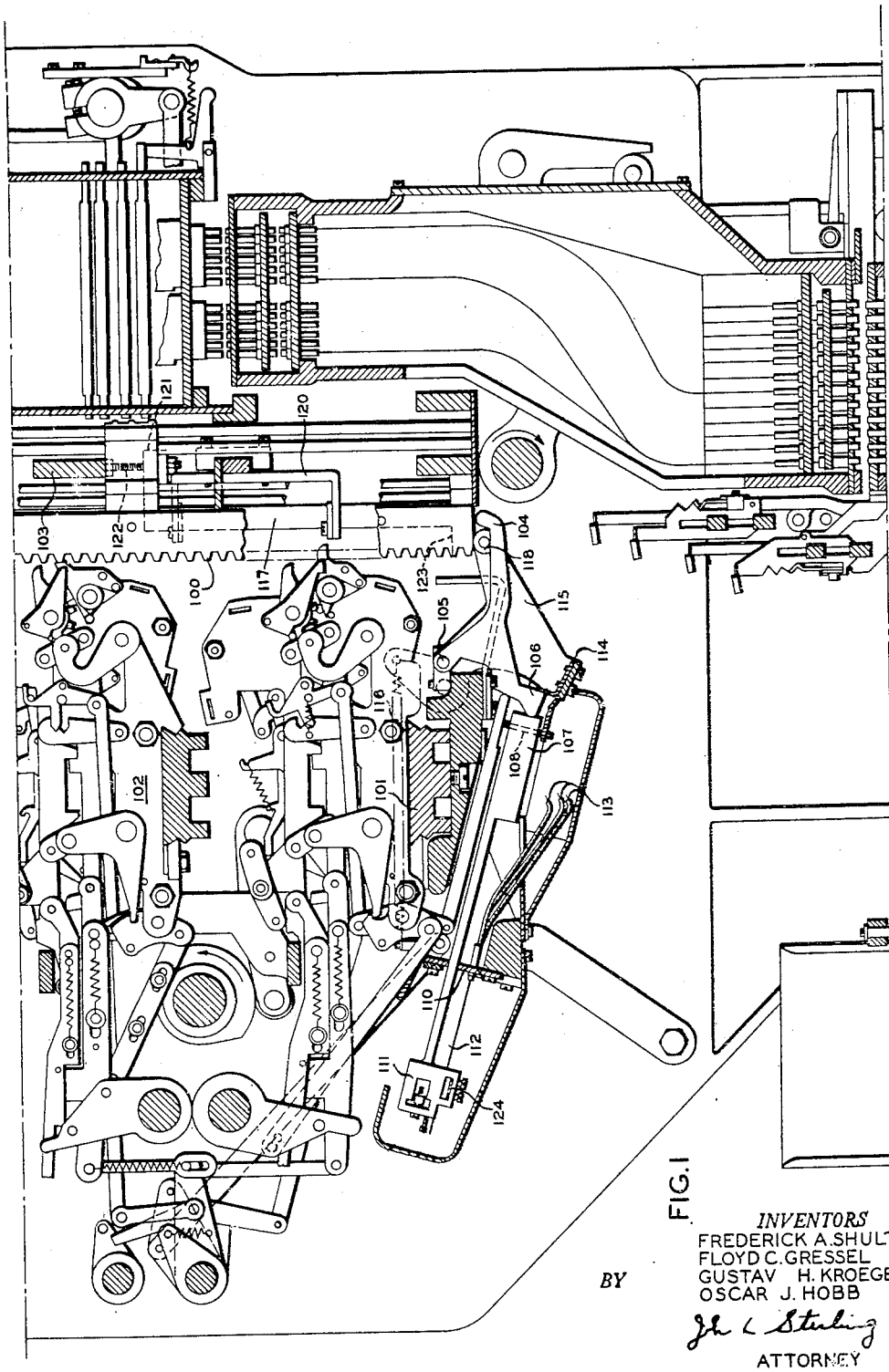

In the illustrated instance of the invention the tabulator is constructed substantially the same as that described in the patent of John Mueller, 2,381,361, dated August 7, 1945, except for those changes described in the patent to Frank A. Lopez, and major portions of the punch, and substantially all of the punch control mechanism in the tabulator, are practically the same as described in the Lopez patent. Reference is made, therefore, to said patents for a complete description of the combined tabulator and summary punch to which the improvements of the present invention are applied, many of those parts of the machine are not directly related to the present improvements not being described at all herein, and those parts more closely akin to the improvements being described as briefly as is consistant with a clear disclosure of the invention.

Tabulator

The mechanism of the tabulator includes a series (100 in the full machine) of type bars 100 (Fig. 1) individually settable in accordance with data sensed in a card, or in accordance with the values present in a total accumulator 101 or a grand total accumulator 102, the type bars having rack teeth on their forward edges to cooperate with the wheels of said accumulators. The accumulators can be positioned to cooperate with any desired type bars 100, and a grand total accumulator can cooperate with the same type bars 100 as a total accumulator or not, as desired. The type bars are moved upward by springs, not shown, and are restored to and held in their lowermost or zero positions by a universal restoring bar 103 reciprocated vertically at appropriate times.

Total control means, not shown, are provided for automatically taking a total from the total accumulator 101 after an entire total group of cards have been fed through the machine, and for automatically taking a grand total from the grand total accumulator 102 after an entire grand total set of total groups of cards have been fed through the machine.

Each type bar 100 carries thirty-six types, not shown, whose spacing is one half that of the bar rack teeth. The topmost type is zero followed by a letter, then "1," then a letter, and so on. Thus nine spaces of the rack teeth equal eighteen type spaces, the "9" type being at about the middle of the bar, and type bars set at numerical values do not rise above about half their maximum stroke.

Type bar sensing mechanism

Each type bar 100, or at least each one whose setting ever has to be transmitted to the punch, has cooperating therewith a sensing lever 104 (Fig. 1) pivoted at 105 and, when operated, spring rocked counter-clockwise, this movement under such spring pressure being limited by contact of the rear end of said lever with the bottom edge of the type bar. The lever shown in Fig. 1 is in its initial position, but if the type bar rises to the extent of 1, 2, 3, etc., to 9 units or tooth spaces, the lever can follow it until arrested by the type bar. The lever is in the form of a bell-crank whose downwardly extending arm 106 contacts with the square end of a slide 107 which is mounted and guided in comb plates 108 and 110. These slides 107 communicate their settings to the punch by Bowden wires. The front end of the slide 107 has a head 111 to which there is tightly clamped the end of the inner wire 112 of a Bowden 113. The casings of these Bowdens are secured to the plate 110. There is, of course, in the full machine a long series of these Bowdens to the number of 100. Back of the plate 110 they are suitably curved and extended into a bundle leading through a hole in the tabulator side frame and over to the punch machine. When the latter is in operation, the Bowden wires are placed under spring tension tending to pull the slides 107 toward the rear of the tabulating machine and to cause the levers 104 to move counter-clockwise until each is arrested in some numeric position by its associate type bar, so that the spring tension tending to rock the sensing levers 104 comes through the Bowden wires from the punching machine.

The restoring bar 114 for the bell-crank 104 and slides 107, consists of the bar 114 of a bail having pivoted arms 115. Springs 116 acting on upward extensions 119 of the arms 115, tend to swing the bail counter-clockwise. This restoring bar is operated by the restoring bar 103 for the type bars themselves. A rearward branch of each arm 115 pushes upward, by the spring 116, on a plunger 117 engaged by a roller 118 on said arm. The plunger 117 is guided in a suitable bracket 120. The upper end of the plunger has a rearward extension 121 with an adjusting screw 122 adapted to engage the restoring bar 103. When the latter rises the plunger follows it for about the first half of its up stroke and until arrested by shoulder 123 on the plunger engaging the bracket 120. The plunger is depressed to operate the restoring bar and restores the sensing lever 104 during the latter half of the down stroke of the restoring bar 103.

The punching machine base

Figure 2:
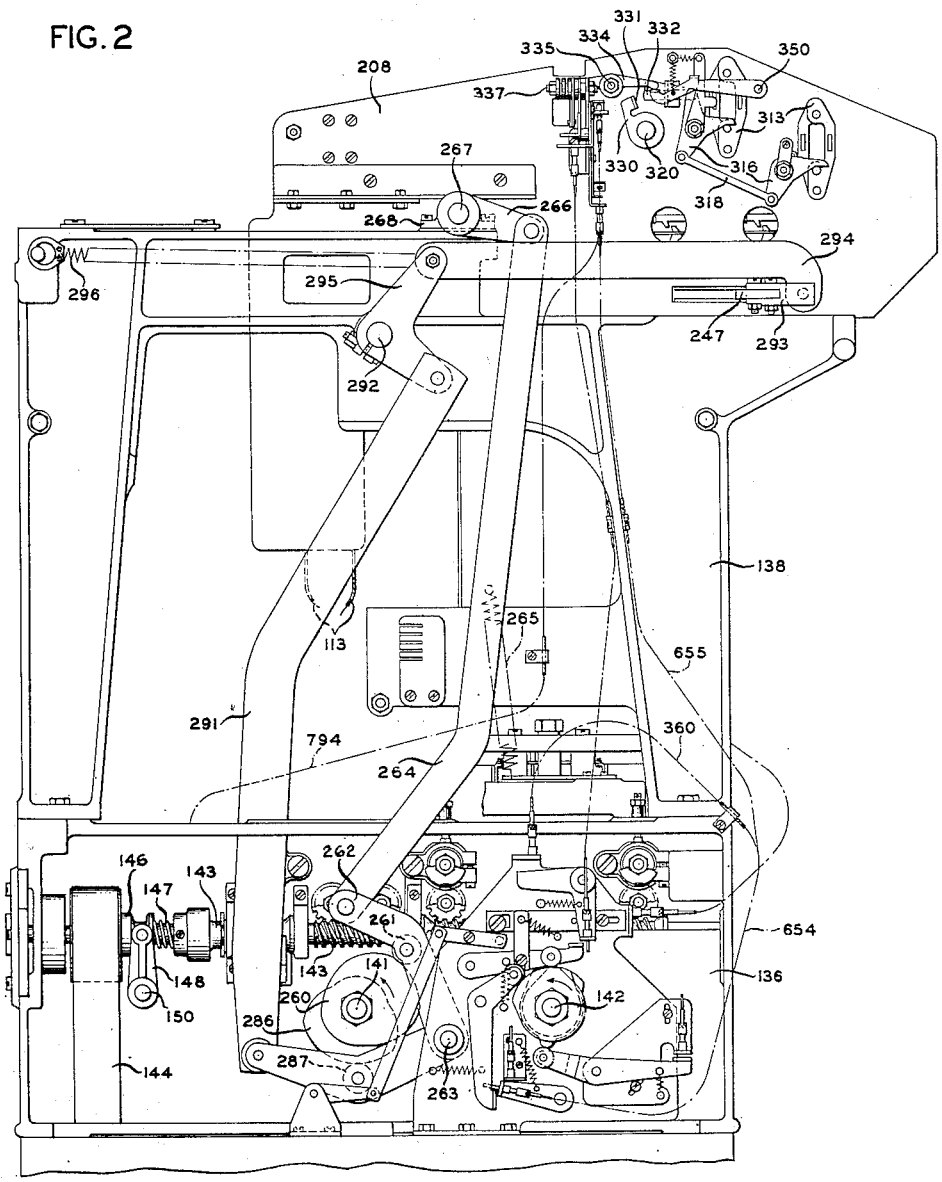
Fig. 2 is a right hand side view of the summary punch with many details omitted to clarify the view.
Figures 3, 4:
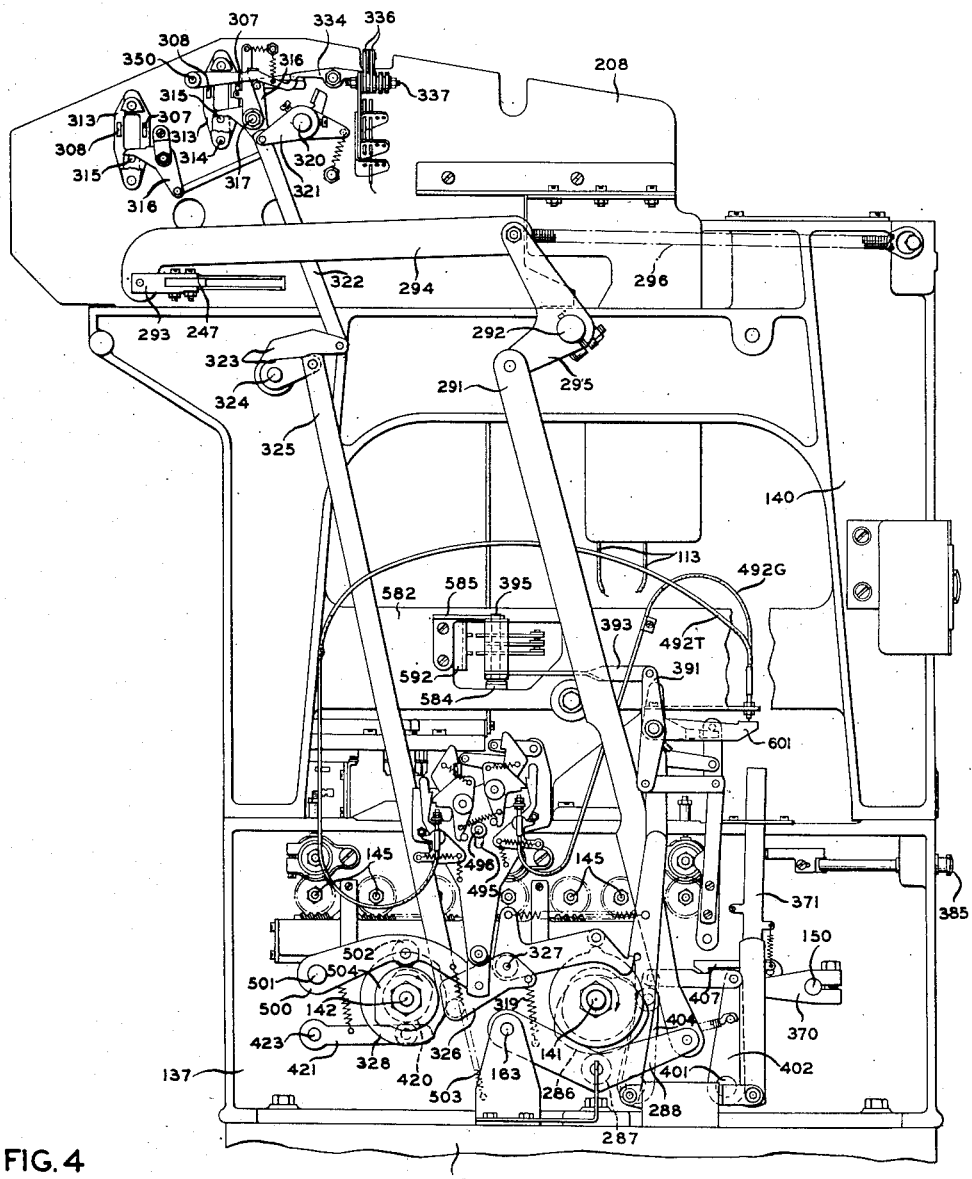
Fig. 3 is a left hand side view of the summary punch, this view also having many details of construction omitted.
Fig. 4 is a detailed sectional view of control means partially shown in Fig. 3.

The framework comprises a foot piece 135, a base frame comprising a right hand side plate 136 and a left hand side plate 137, each consisting of an ordinary vertical web surrounded by flanges (Figs. 2 and 3) and surmounting said side pieces a frame comprising a right hand upright member 138 and a left hand upright side member 140, each comprising flanged edges of the usual construction. In the base section are a front cam shaft 141 and a rear cam shaft 142 (Figs. 2 and 3). These shafts are driven in the usual manner, namely, in the right hand box-like frame 136 (Fig. 2) is a worm shaft 143 driven from an electric motor by belt 144 and having thereon the usual worms for driving the two shafts 141 and 142, and also worms for driving feed roll shafts 145. The worm shaft 143 is controlled by a clutch 146 which is engaged by a spring 147 and is disengaged by a yoke 148 fast on a rock shaft 150, all as is usual in these machines. The controls for this rock shaft 150 will be described hereinafter. The clutch is, of course, opened by rocking said shaft clockwise in Fig. 2.

Summary cards to be punched are fed from a hopper 151 (Fig. 5) by a picker 152 to feed rolls 153 on shafts 145, which rolls convey it to a card chamber consisting of the space between the perforated die plate 154 and a perforated plate 155 for the punches 156. From this chamber the cards are fed by feed rolls 157 to a receptacle 158 in the usual manner.

The die plate 154 and the guide plate 155 are mounted on a fixed irregular rectangular shaped casting 160. The punches 156 are guided in the perforated plate 155 and in another plate 161, secured to the plate 155. At their upper ends, the punches are headed and pass through a stripper plate 162 which, however, is a movable part not fast on the casting 160.

Set pin unit

Above the casting 160 and the punches 156 is mounted a vertically reciprocating set pin box 163. This box has end castings 164 (Fig. 7) to which are screwed transverse sheet metal plates 168 (Fig. 5) which in turn support the horizontal guide plates of the set pins 165. The set pins work in the usual manner and when one of them is depressed it is locked down by the usual locking slide 166, there being two of these slides for each row of pins, one for the six upper zone pins and the other for the six lower zone pins; and the two are mounted one above the other so as to be separately operable for retracting purposes, all of which will be described hereinafter. This set pin box moves upward in order for its pins to be selectively set and locked down, and then downward when the pins so set force their punches through the card.

The set pin box 163 is reciprocated up and down as follows: The stationary casting 160 has at each end a bulge, bored vertically, to serve as a guide for a reciprocating rod 167 (Fig. 7) which in its upper part is secured to the end casting 164 of the set pin box in the same manner as described in the Lopez patent.

In the machine described in said Lopez patent the rods 167, and, therefore, the set pin box 163, were reciprocated vertically by an eccentric. For reasons to become evident hereinafter, however, in the improved machine of the present invention, said eccentrics are replaced by cams.

Each rod 167 terminates at its bottom in a squared end 170 (Fig. 5) which is secured by bolt and nut 171, 172 to the upper portion of a cam follower plate 173 (see also Fig. 7) having therein a cutout 174, through which projects the rear cam shaft 142. The plate 173 has pivoted thereon, on a vertical line through the center of shaft 142, a pair of follower rollers 175, one above and the other below said cutout, both, however, overlapping the cutout and engaging the periphery of a cam 176 fixed on the shaft 142. Another cam conveniently located on the shaft 142, and to be more fully described hereinafter has a collar 177 which to prevent front and rear movement of the plate 173 engages finished, vertical guide ways 178 formed on the said plate and projecting into the cutout 174 at either side thereof. The two plates 173 are connected together by a pair of rods 179 secured to the plates at their lower, front and rear corners, said rods serving to fix the relative positions of the lower ends of said plates. As shown, cam 176 has a high portion and a low portion diametrically opposite to one another, so that when one roller 175 is engaged by the high part, the low part engages the other roller. It will be seen, therefore, that when high portion 180 engages the upper roller 175 the set pin box 163 is in its highest position, and when said high portion engages the lower roller 175 the set pin box is in its lowermost position. When the concentric portions of the cam engage the rollers the set pin box is in its mid position.

The wiring unit, designated generally as 185, is substantially the same as described in the Lopez patent and comprises an enclosed rectangular box. The rear frame plate 186 and the front frame plate 187 of the unit have mounted between them at their upper ends (Fig. 6) a series of rows of plungers 188 adapted to be depressed by gag bars, as will presently be explained. Beneath said plungers are horizontal plates to support the upper ends of the casings of Bowdens 190 whose wires are respectively depressed by the plungers.

In the specific machine illustrated, there are one hundred gag bars corresponding to the one hundred type bars in the tabulator; and there are fifty front to rear offset rows of plungers 188, each row including six plungers controlled by one gag bar and six plungers offset to one side to be controlled by the next adjacent gag bar. This in distinction to the Lopez device in which the twelve plungers were in a continuous row.

The Bowden casings are secured in the same manner at their lower ends (Fig. 5) to two transverse perforated plates. These plates, however, comprise only forty-five columns of front to rear rows of holes corresponding to the columns of the card to be punched.

The lowermost section of the wiring unit includes a guide plate 191 for the upper ends of a series of plungers 192 whose lower ends are guided in a bottom plate 193. There is one of the plungers 192 directly beneath each Bowden wire, by which it may be depressed. Said plungers are pressed upward by springs 194 whose pressure is communicated through the Bowden wires to the plungers 188 which are thus normally held in their upper positions.

The plungers 192 project beneath the bottom plate 193 of the wiring unit and each of them stands immediately above one of the set pins 165 hereinbefore described. The construction is such that if one of the plungers 188 be depressed by the gag bar, it will set the corresponding set pin 165 which will be held in its depressed or set position as hereinbefore described.

The bottom plate 193 of the wiring unit is extended to form flanges which can be slid from the back of the machine into slots in rail bars 195 (Fig. 7) rigidly mounted on top of the castings 164 of the set pin box so that the wiring unit is secured to and reciprocates up and down with the latter. This whole structure will hereinafter be referred to as the set pin unit.

In the stop or mid position of said unit the plungers 188 (Fig. 6) at the top thereof are out of contact with the gag bars and the set pins are not low enough to depress the punches. When the set pin unit moves upward to the upper limit of its motion some of the plungers will be arrested by the gag bars with the result that the corresponding set pins will be set and locked by their locking slides 166; and when, thereafter, said unit is moved to its lowermost position, those set pins will push their corresponding punches through the card.

Stripper plate

The stripper plate 162 is mounted independently of the set pin unit and is independently reciprocated. The stripper plate is screwed to two transverse bars 196 which are secured at each end to a yoke 189 (Figs. 5 and 7) connected by a reciproating rod and a short link with a pair of follower levers 197, all as described in the Lopez patent. The follower levers 197 are pivoted at 198 and have a follower roller 200 pressed against a cam 201 on the rear shaft 142 by a spring 199.

As shown by the time chart (Fig. 23) the set pin unit is at its lowest position from about 15° to 25° of cycle, rises to a mid position at about 76°, remains in this position till about 141°, rises to its highest position and remains there from 195° to 205°, then moves downward and remains in a mid position from 246° to 320° and finally moves downward to its lowest position again. Thus, the set pins receive their setting between 190° and 210° of cycle and the punches are pushed through the card between 10° and 30° of the next cycle. The stripper plate, as shown on the time chart, is in its uppermost position from about 80° to 270° of cycle, and reaches its lowermost position at about 304°, descending a little ahead of the set pin unit. The stripper plate remains in its lowermost position until about 35° of the following cycle and then rises again, shortly behind the set pin unit.

The mechanism thus far described is substantially identical with that described in the cited patents with the few exceptions pointed out.

The primary set-up mechanism

The Bowdens 113 after emerging from the left hand side of the tabulator (Fig. 15) are passed through a sort of clamp 202 and formed into a cable which extends across into the punching machine.

Figure 6:
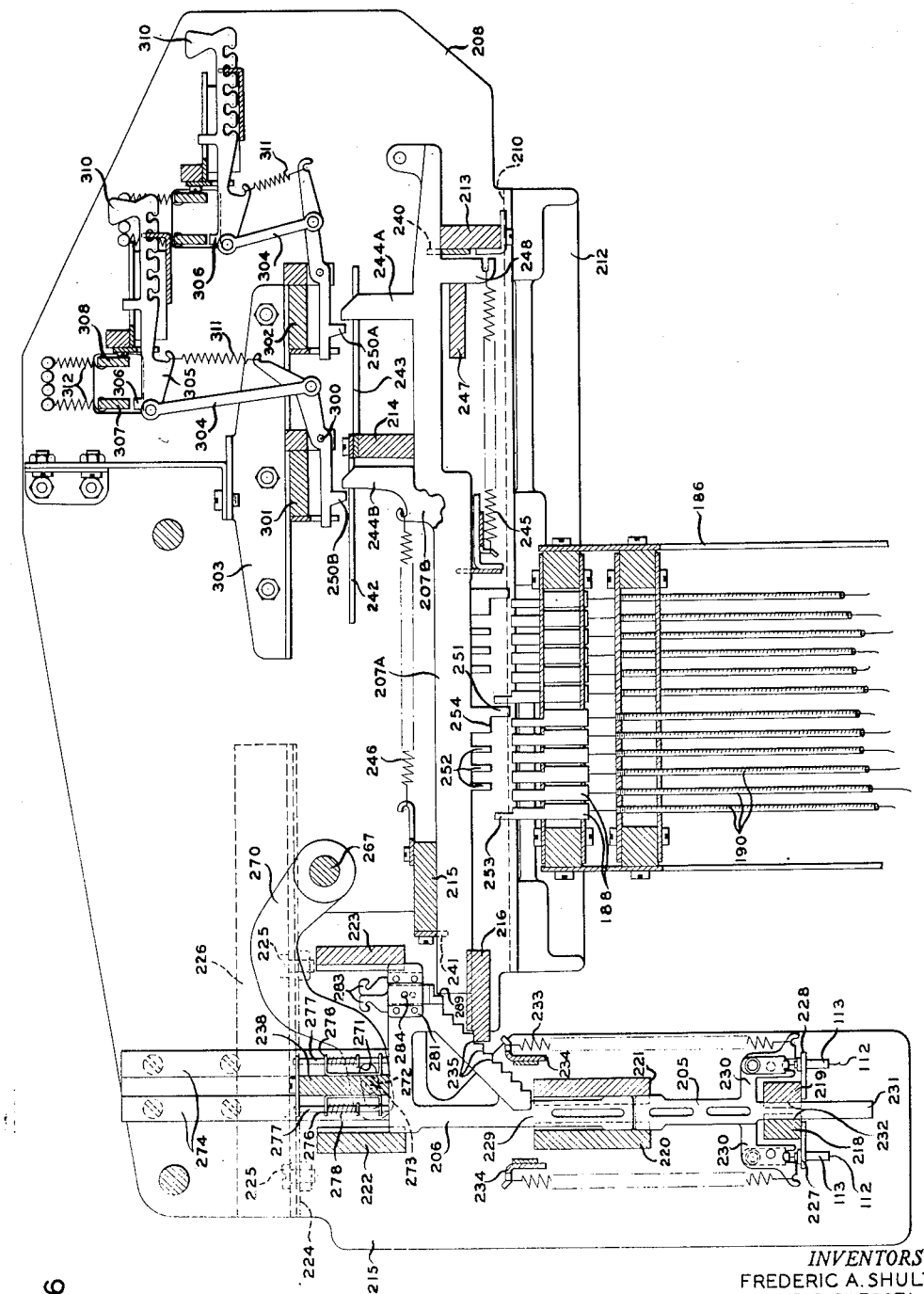
Fig. 6 is a front to rear sectional view of the head of the punch on about the same line as Fig. 5.

The means controlled by said Bowdens for entering the correct numerical amounts into the set pins has been changed radically from that disclosed in the Lopez patent and can be understood by reference to Fig. 6. In each denominational position there are three slides, viz., a positioning slide 205, a step sector slide 206 and a gag bar 207, the last having gags consisting of projections from its under edge for cooperation with the plungers 188 of the wiring unit hereinbefore described.

Figure 11:
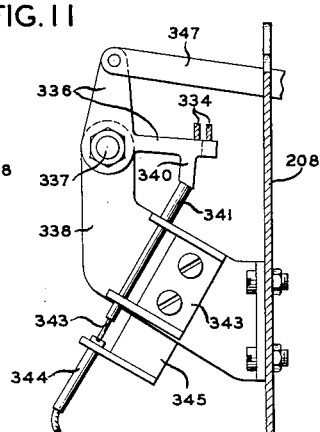
Fig. 11 is a fragmentary front view of part of the mechanism shown in Fig. 10.

The gag bars and certain control mechanism therefor are mounted in a detachable unit comprising large sheet metal side plates 208 (Figs. 2, 3, and 6) having flanged lower edges 210 secured by bolts 211 atop cast brackets 212 fastened to the inner faces of the frame pieces 138 and 140 (see also Fig. 11). The plates 208 are interconnected by several cross bars 213, 214, 215, and 216 which will be referred to in greater detail hereinafter.

The step sectors 206 and the positioning slides 205 are mounted in a unit comprising sheet metal side plates 215 interconnected by cross bars 218, 219, 220, 221, 222 and 223. The side plates 215 have their upper edges bent outward to form flanges 224 which are secured by bolts 225 to angle bars 226 fastened on the forward portions of the outer faces of the side plates 208 of the gag bar unit, said side plates 208 having the portions thereof below said angle bars cut away to accommodate the step sector, positioning slide unit. Thus the gag bar unit is mounted atop the main frame work of the machine and the step sector unit is suspended beneath and supported by said gag bar unit.

After reaching the punch, the Bowdens fan out upwardly and the casings 113 thereof are secured to a plate 227 (Fig. 6) fastened to the under side of cross bar 218 of the step sector unit or to a plate 228 secured to the under side of the adjacent cross bar 219, fifty of the casings being secured to the plate 227 and fifty to the plate 228. The inner wires 112 of the Bowdens are secured to off set arms 230 of the positioning slides 205, said arms projecting from the opposite edges of adjacent slides above the bar 218 or 219. Thus the lateral spacing of the Bowdens and the arms 230 is twice that of the slides themselves. Each slide has a downwardly extending tail 231 guided in grooves 232 in the proximate faces of the bars 218 and 219; and at their upper ends, the slides are guided in similar grooves in the proximate faces of the cross bars 220, 221. Springs 233 serve to tension slides 205 upward, said springs being secured at their upper ends to cross members 234 and at their lower ends to suitable fingers of the arms 230 of the slides.

The step sectors 206 have downwardly extending tails 229 also guided in the grooves in the bars 220 and 221, so that each step sector has located there beneath a positioning slide 205 by which it can be raised to the several numerical positions 1–9. At their upper ends the step sectors are guided in grooves in the proximate faces of the cross bars 222, 223.

The construction is such that if a slide 205 be moved upward by its spring 233, it will draw after it the wire 112, which in the tabulator (Fig. 1) draws one of the slides 107 toward the rear of the machine, swinging the bell-crank 104 counterclockwise until arrested by the bottom of the type bar in some numeric position. The upward motion of the slide 205 and, therefore, of the step sector 206 will, therefore, be limited to some one of ten positions appropriate to the numerals 0–9.

The step sectors 206 are each in front to rear alignment with a gag bar 207, and above the tail portion 229 thereof, each has its rear edge inclined rearwardly so that the upper end of the sector is considerably wider from front to rear, than is the tail 229. Ten steps 235 representing from top to bottom, the numerals 0–9, are cut in said inclined edge, said steps forming stops to arrest the advance movement of the associated gag bar in the appropriate numeric positions.

The step sectors preferably are provided with cutouts 236 to decrease their weight, and the stepped edge of each preferably has secured thereto a similarly stepped metal strip 237 (see also Fig. 8) whose purpose it is to widen and bolster the steps, or stops 235.

A restoring bar 238, to be described more in detail hereinafter, is provided for restoring the step sectors to their lowermost or zero positions wherein the bottom of the "3" step 235 limits on a shelf of the cross bar 216.

The gag bars have been modified somewhat from those described in the Lopez patent, but the manner in which they operate the plungers 188 is unchanged; and, as in the Lopez machine, the gag bars are, to provide room for operating springs and the like, of two types interspersed one with the other, the one type being indicated at 207A (Fig. 6) and the other at 207B.

All of the gag bars are guided for front to rear sliding movements in comb plates 240, and 241 secured to the cross bars 213 and 215, respectively, and in grooves in the bar 216, one gag bar to each groove or comb slot rather than two as in the Lopez device. Further guidance is provided by comb plates 242 and 243 which are secured to the cross bar 214 and engage upstanding fingers 244 of the B and A gag bars, respectively.

The gag bars are advanced into engagement with the steps 235 of the step sectors 206 by springs 245 and 246, the former serving the A set of gag bars and the latter the B set. The gag bars are restored to, and are normally held in their rearmost positions by a restoring bar 247 which acts on projections 248 from the undersides of the gag bars. When at the appropriate time this restoring bar moves leftward in Fig. 6, the gag bars follow it under impulse of their springs 245 or 246 until arrested in the appropriate numerical positions by the step sectors. Normally, however, each gag bar is locked against such movement by a latch 250. At each operation of the machine these latches are released selectively by control mechanism to be described hereinafter, so that only those gag bars advance that are required in that operation.

Each of the gag bars has depending therefrom a long finger 251 and three shorter fingers 252 which cooperate with the plungers 188 in the top of the wiring unit hereinbefore described. In Fig. 6 the gag bars are shown in normal position with the fingers of the A gag bar located, so as, when set to numerical positions, to act on the lefthand or forward six of the plungers 188, and the fingers of the B bar located to cooperate with the rightward or rearmost offset six of the plungers. This is one of the differences between the A and B gag bars, and is the reason for offsetting the rows of plungers.

The "one," "three," "five," and "seven" plungers 188, that is, the second, third, fourth and fifth plungers from the right of each set of six, each has its upper end wide enough so that it may be depressed either when a finger 251 of the gag bar is over the right hand half of it to punch an odd number, or over the left hand half of it to punch an even number, and the "nine" plunger has its right hand half of the same height as the other plungers but its left hand half is prolonged upward into a finger 253 long enough to be depressed by any one of the three gag bar fingers 252 when the gag bar is set at an even number position. When the bar is set at "one," the left hand finger 252 stands over the right hand half of the "nine" plunger and does not operate the latter, but when the bar is set one step further leftward then this finger 252 will depress the "nine" plunger while the finger 251 depresses the "one" plunger, and so on. Extending leftward from the finger 251 is a shoulder 254 in line with the fingers 252, and the left hand portion of this shoulder constitutes in effect a fourth finger 252 which depressed the "nine" plunger when the gag bar is set at "eight." When the gag bar is set at "nine" the finger 251 stands over the right hand half of the "nine" plunger 188 and almost in contact with the finger 253. The "zero" plunger 188 has only its left hand half projecting above the top of the wiring unit so that the portion of that acted on by the finger 251 is a comparatively slender finger. When a gag bar is set at "zero" this finger stands under the right hand half of finger 251 as viewed in the drawing. It will be noted in Fig. 6 that when a gag bar is in its normal position no zero will be punched, but the bar must be drawn leftward to the position just above described in order to punch a zero. The construction lends itself to the punching of zeros or not, as desired, means to which end will be described hereinafter.

Restoring the step sectors

The restoring bar 238 for the step sectors is reciprocated by a cam 260 on the front drive shaft 141 of the machine (Fig. 2). A follower roller 261 for said cam is mounted between the two arms of a follower lever 262 which is pivoted on a stud 263 and has its free end pivotally connected to a long upwardly extending link 264 tensioned downward by a strong spring 265. At its upper end link 264 is connected with an arm 266 fast on a shaft 267 journaled in hubs secured to the side plate 208 of the gag bar unit and also in a bracket 269 secured atop the right hand upright frame member 138. Secured on the shaft 267 within the side plates 208 (Fig. 6) is a pair of arms 270 each having at its free end a slot 271 which embraces a roller 272 on a pin 273 extending across a slot in the restoring bar 238. At each end the restoring bar is slidably mounted between upright bars 274 secured to the side plates 208 so that the motion of the restoring bar is straight up and down, the slots 271 riding back and forth on the rollers 272. The timing of cam 260, and, therefore, of the restoring bar 238, is shown on the time chart (Fig. 23).

It will be noted that the step sectors 206 are pushed upward to their set positions by the positioning slides 205, but are not connected with said positioning slides. Means are, therefore, provided to prevent overthrow of the step sectors past their set positions.

Two channel brackets 276 are secured one to the rear and the other to the front face of the step sector restoring bar 238, and each carries a series of shouldered pins 277 pressed downward each by a spring 278 against the upper edge of a step sector 206. The pins 277 in each bracket cooperate with alternate step sectors. The operation is as follows: Referring to the time chart, it will be seen that when at 38° of punch cycle the restoring bar 238 begins to rise, the type bars in the tabulator have already risen more than half the distance to their "9" positions, so that the springs 233 are tensioning the positioning slides 205 (Fig. 6) against the step sectors 206. Therefore, during the rise of restoring bar 238 the springs 278 of the pins 277 are maintained compressed each by the associated step sector until the related positioning slide is halted in its rise by its tabulator type bar, at which time the spring 278 begins to expand and acts to prevent further upward motion of the step sector. When the restoring bar reaches its uppermost position, the fully expanded springs 278 maintain the lower edges of the pins 277, each just above the upper edge of the related step sector if the latter is set in its highest or "9" position.

Zero punching

In order that zeroes can be punched or not as desired, each of the step sectors 206 has associated with its zero stop 235, means settable effective and ineffective to prevent the cooperating gag bar 207 from being set in its zero position. To this end the zero stop 235 of each step sector is extended upward (Figs. 6 and 8) and has aligned therewith the forward edge of a vertical groove 280 cut in the upper rearward corner of the step sector and formed into a slot by a thin metal plate 281 riveted to the side of the step sector. Mounted in this slot is a zero blocking interponent 282 whose forward edge abuts the zero stop 235 and which is settable to two positions, namely, an upper ineffective position and a lower effective position. The interponent is set by means of a finger piece 283 and is held in its set position by an extrusion 284 of plate 281 engaging in one or the other of a pair of vertically spaced holes 285 in the interponent. The interponent is limited to movements between its effective and ineffective positions by a shoulder 275 thereof which engages the upper edge of the step sector, and by lateral ridges 279 formed by increasing the thickness of the lower end of the interponent, and engaging the underlip of slot 280. The thickened lower portion of the interponent is provided with a step 289 which, when the interponent is set effective, is interposed between the gag bar and the zero stop 235 of the step sector but when the interponent is set in its ineffective position is raised above the gag bar.

It will be seen, therefore, that if the interponent is set effective and the step sector remains in zero position, the stop 289 prevents advance of the gag bar to zero position. However, if the step sector is raised to one of the numeric positions 1–9, the step 289 moves out of the path of the gag bar and the latter advances into contact with the appropriate stop 235. If the interponent is set in its ineffective position, the step 289 is moved out of the path of the gag bar and the latter is free to advance to zero position.

It is to be mentioned that in order to facilitate manipulation thereof the interponent finger pieces 283 are arranged in front and rear rows, one piece being in the front row and the next adjacent piece in the rear row.

Restoring the gag bars

The restoring bar 247 for the gag bars 207 is reciprocated by a pair of cams 286 (Figs. 2 and 3) on the front power shaft 141, one at either side of the machine. A follower roller 287 for each said cam is mounted between the two parallel arms of a follower lever 288 pivoted on the stud 263 there being one of the latter projecting from each base frame piece 135 and 137. Said follower lever is connected by a long link 291 with a bell-crank 295 fast on a shaft 292 journaled in the side frames 133 and 140. The restoring bar 247 extends clear through both the right and left frame castings and at each end it has secured thereto a block 293, to which is pivoted a link 294 which is also pivoted to the upright arm of the bell-crank 295 on the shaft 292. The cams 286 move the bar 247 rearward, and the latter is moved frontward by springs 296. The bar 247 is guided between two guide bars, bolted to the inside faces of plates 208. The timing of cam 286 and, therefore, of the restorting bar 247 is indicated on the time chart (Fig. 23). Referring to the time chart and to Fig. 1 the type bars are restored from 9 to normal positions from around 230° of tab cycle and the reading levers 104 and Bowden wires 112 are also restored pulling the Bowdens back away from the punch (Fig. 6). The step sectors 206 cannot return to normal at this time because they are held up by the gag bars 207 engaging the steps of the sectors. These gag bars cannot return to normal position at that time (some 200° of punch cycle) because the set pin unit is at that moment above mid-position taking a reading from the gag bars. In short, at the time when the bowdens are pulled back by the tabulator, the step sectors are unable to follow them. It is for this reason mainly that the positioning slides 205 are made separate from the step sectors. They are so arranged that when taking a reading from the type bars, the positioning slides push the step sectors up to their several numerical positions where they are held against descending by the gag bars; but when on the restoration of the type bars the Bowdens are pulled down, the positioning slides are free to follow them leaving the step sectors in set positions. As shown on the time chart the wiring and set pin unit is restored to mid position around 256° and it is then that the restoring bars for the gag bars and the step sectors begin to restore those parts to normal. The set pin unit is above normal position from about 141° to 256° and during that period the gag bars and step sectors are stationary in their set positions.

This device greatly reduces the time required for the various operations without causing any conflict between the movements of the type bars and of their co-operating parts in the punch.

In the patent to Rindfleish, No. 2,354,549, July 25, 1944, there is described a combined tabulator and summary punch having step sectors which are set differentially by reading or sensing fingers which sense the type bars; and gag bars are set against the step sectors. That machine presented the same problem of timing as the present machine, viz., that the type bars must go on with their movements for some time while the step sectors and the gag bars must remain stationary in order to perform their functions; but in the patented machine this end is achieved by entirely different means, working on a different principle. In that machine the feeling fingers are connected directly with the step sectors and move with them in both directions. The prior mechanism is described also in the earlier Patent No. 1,998,281.

Releasing the gag bars

The means for tripping the latches 250, which normally restrain the gag bars is substantially identical with the means utilized to trip the latches from the type bar slides in the Lopez patent, and will now be described.

The latches 250 are pivoted at 300 (Fig. 6) and are guided by a comb plate supported on frame bars 301 and 302 secured to brackets 303 on side plates 208; and each of said latches is extended rearward to constitute a lever of the first order which may be rocked by a link 304 pivoted to a hand settable interponent 305. Said interponent has at its front end a nose 306 which is shown standing beneath a universal releasing bar 307. If this bar be depressed, it will rock the latch lever 250 to release the gag bar. As described in the Lopez patent, provision is made for four of these bars which are moved downward under certain controls. However, in the present instance only two bars are shown, namely, bars 307 and 308, and only the control means for these two bars will be described. Each interponent 305 has a sort of handle 310 by which, if it be lifted, the interponent may be slid front or back so as to bring the nose 306 into register with either one of the releasing bars 307 or 308. The interponent 305 can also be set with the nose 306 in front of both releasing bars, and will, therefore, not be depressed by either of them. A spring 311 connecting the rear end of the lever 250 with the interponent 305 serves to hold the latter in its set position and to rock the latch lever to locking position.

In the present instance, the bar 307 is used for releasing those gag bars appropriate to totals and grand totals, and the bar 308 for those gag bars appropriate to designations taken from a first card after total or grand total.

It will be noted in Fig. 6 that there are two complete sets of these releasing devices, namely, an upper forward one, serving the "B" gag bars, and a lower rear one, serving the "A" gag bars.

Figure 10:
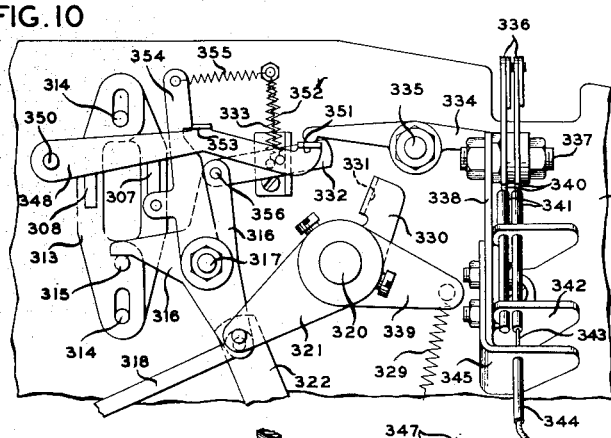
Fig. 10 is a fragmentary view from the left of control mechanism located in the head of the punch.

Each of the bars 307, 308 is a long bar extending clear across the gag bar section of the machine and projecting through windows in the side plates 208 and extending a suitable distance beyond said plates; and each is held up by two springs 312 (Fig. 6) one at either end thereof. The guiding and operating means for the ends of these bars are alike at all four windows and a description of one, namely, the forward and higher one in Fig. 3 will make the rest readily understood. Two slides 313 (Fig. 10) have mirror reversed shapes and each has one of the releasing bars passing through it. Each of the slides has at top and bottom an elongated hole, by which it is mounted on studs 314 for sliding motion up and down, the slides being spaced apart by suitable spacers. These slides 313 are normally held in their upper positions (Fig. 10) by the springs 312 acting on the releasing bars, but each of the slides has a stud 315 which is acted on by a three armed lever 316 pivoted on a stud 317 projecting from the side plate 208. This whole arrangement is duplicated on the lower rear set, whose levers 316 also have depending arms connected with like arms of the forward set by links 318. The construction is such that if the forward lever 316 be rocked counter-clockwise, it will pull down its slide 313 and associated releasing bar and, through link 318, also depress the corresponding bar of the rear set. Thus the releasing bar 307 of the front set and the releasing bar 307 of the rear set are operated in unison, and the same applies to the bars 308. The whole arrangement above described is repeated on the right hand side of the machine in order to depress both ends of a releasing bar simultaneously.

In order to operate the releasing bars selectively the following means are provided which means, except as will be pointed out, are substantially as described in the Lopez patent: A rock shaft 320 (Figs. 2 and 3) passes through both the frame plates 208 and at its left hand end has an arm 321 connected by a link 322 with the inner arm of a two armed lever 323 pivoted on a stud 324. The outer one of said arms is connected by a link 325 with a follower lever 326 pivoted on a stud 327 in the base of the machine, said lever having a follower roller pressed by a spring 319 against a cam 328 on the rear cam shaft 142. An auxiliary spring 329 connected to an arm 339 on the shaft 320 is also provided. This cam is so shaped as to rock the shaft 320 counter-clockwise in Figs. 3 and 10 before the restoring bar 247 begins its advance movement. The timing of these parts appears on the time chart (Fig. 23). Said shaft 320 has two arms 330 projecting upward therefrom, one at each side of the machine (see also Fig. 10), and each has formed off therefrom a flange or ear 331.

Each of the levers 316 of the upper front set has an upstanding arm to which is pivoted an interponent 332 which is normally held in its upper position by a spring 333, and forward of its pivot, is guided in a suitable comb plate. In such upper position the front end of said interponent is out of the path of movement of the flange 331, but this interponent may be swung or set downward to active position where it stands in the path of such movement and will be forced rearward, rocking the lever 316, and through the link 318, the corresponding lever of the rear set. There are two of these interponents one for the total releasing bar 307 and one for the designation releasing bar 308, and means are provided, under automatic control, to set them selectively into the path of the ear 331.

All of this selective operating mechanism, that is to say, the interponents 332 and the operating lever 330, 331, are duplicated on the right hand side of the machine.

The interponents 332 are depressed selectively by setting levers 334 (Fig. 10) pivoted and suitably spaced on a stud 335. The forward arms of these levers are of graduated lengths to be operated by bell-cranks 336 (Fig. 11) pivoted on a stud 337 mounted on a bracket 338 secured to the side plate 208. These bell-cranks are in transverse planes perpendicular to those of the levers 334 and their horizontal arms are of graduated lengths corresponding to those of the levers 334. Each bell-crank 336, therefore, has its end lying beneath the end of only one of the levers 334. The bell-crank 336 appropriate to the total releasing bar 307 has a branch 340 (Fig. 11) adapted to be operated by a push rod or plunger 341 mounted in a bracket 342 secured to the bracket 338. Rod 341 registers with the plunger 343 of a Bowden 344 whose casing is secured to a bracket 345 also mounted on the bracket 338. This Bowden 344 leads to an appropriate control device and if it be operated, its associate push rod will rock its bell-crank 336 counter-clockwise (Fig. 11), rocking lever 334 and setting the total interponent 332 to be operated by ear 331. According to the invention, however, the bell-crank 336 appropriate to the designation releasing bar 308 is operated in another manner to be described hereinafter.

Figure 12:
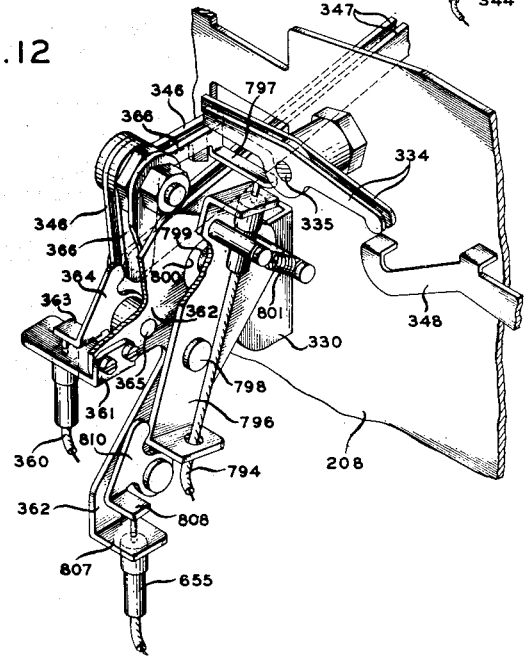
Fig. 12 is a fragmentary perspective view from the rear and to the right, of control mechanism located in the head of the punch.

The levers 334 are repeated on the right hand side of the machine and they are controlled by a bell-crank 346 or 366 (see Fig. 12) the former controlling the total lever 334 and the latter the designation lever 334. The vertical arms of bell-cranks 346 and 366 extend downward from their pivots, instead of upward, and are connected with those of the bell-cranks 336 by links 347. Whenever the total bell-crank 336 is rocked by its Bowden wire, the corresponding bell-crank 346 is rocked also, and whenever the designation bell-crank 366 is rocked by means to be described hereinafter the associated bell-crank 336 is rocked, so that each train of linkage, both right and left, is controlled and operated in unison.

Special mechanism is provided for controlling the designation releasing bar 308. A lever 348, pivoted on a stud 350, (Fig. 10) has at its forward end an ear 351 lying over the top of the designation interponent 332 and beneath the associated lever 334, so that an operation of the latter depresses the lever 348 and with it the interponent. A spring 352 tends to rock the lever 348 upward. Near its middle the lever 348 has another ear 353 formed off therefrom and adapted to be engaged and held down at times by a shoulder on a latch lever 354. Said latch is pivoted on the stud 317 and is drawn toward the front of the machine by a spring 355. The operation is as follows: The lever 348 is normally free of its latch and is held up by its spring 352 with its ear 351 pressing against the lever 334, and with the spring 355 pressing the edge of latch 354 against the edge of the ear 353. On receipt of a signal from the control mechanism, that is to say, when the designation lever 334 is operated by means presently to be described, the latter lever depresses the lever 348 and moves the interponent down into the path of the operating flange 331; and the latch 354 is snapped over the ear 353 by its spring 355, to hold the lever 348 down if the pressure on lever 334 is relieved before the ear 331 actuates the associate interponent 332. When the shaft 320 is rocked, the releasing bar 308 is depressed, the same as with the bar 307 above described. When in this operation the lever 316 is rocked, a stud 356 in the upright arm thereof pushes the latch 354 out of engagement with said ear and the lever 348 is drawn upward by its spring so that the associated interponent 332 is not operated again until a fresh signal again depresses lever 348.

This operation of the designation releasing bar 308 is different from that described in the Lopez patent where the bar was so controlled, as during a run of the punch, to operate during each of two or more successive cycles with all of the operations save the last being idle ones. In the present instance the designation bar 308 does not partake of those idle operations, but is operated only on those cycles when the associated gag bars are to perform their function of setting up the designation. Control means for selecting the cycle on which said bar is to be operated will be described hereinafter. Said control means, at the appropriate times actuate a Bowden wire 360 (Fig. 12) whose casing is secured to a bracket 361 mounted on a plate 362 secured to the right hand bracket 338. The Bowden acts on an ear 363 formed on one arm of a bell-crank 364 pivoted at 365 on plate 362. The other arm of said lever abuts the edge of the depending arm of the designation bell-crank 366 pivoted on the stud 337 fixed in the right hand bracket 338. The horizontal arm of bell-crank 366 underlies the forward end of the right hand designation lever 334. The said depending arm of bell-crank 366 is, as mentioned above, connected by the link 347 with the associated bell-crank 336 on the left hand side of the machine so that an actuation of Bowden 360 effects a rocking of both bell-cranks, and of the levers 334 associated therewith.

*Starting and stopping the machine*

The means for controlling the punch clutch have been modified somewhat from that described in the Lopez patent. The shaft 150, a clockwise rocking of which opens the clutch (Fig. 2), extends through the base of the machine and (Fig. 3) projects through the web of the left hand frame 137, where it has fast thereon an arm 370, rocked counter-clockwise to open the clutch by a long link 371 which (Fig. 19) is pulled downward by a lever 372 of the first order through a link 373. Lever 372 is pivoted in a suitable bracket mounted on the frame 137 and the rear end thereof is raised to close the clutch through an upstanding interponent 374 pivoted to the said rear end and having in its rear edge a shoulder 375 moved upwardly by a lifting nose 376 on the free end of a cam follower 377. The follower 377 is rocked to lift said interponent by a cam 378 on the front drive shaft 141, a roller 380 carried by said follower being held in contact with the cam by a spring 381. Said spring 381 also tends to hold the interponent 374 in position to have its shoulder 375 acted on by nose 376.

The action of the link 371 on the arm 370 may be controlled in any suitable way, the particular mechanism utilized in the present instance, being substantially identical with that which is described in the Lopez patent and which is described and claimed in the patent to Alvine 2,151,177, dated March 21, 1939.

Referring to Fig. 19, the arm 370 is normally held down by a toggle mechanism acting on a pin 382 in the arm. The details of the toggle mechanism are described in the cited patents. The toggle mechanism is straightened to hold the clutch open, by the links 371 and 373 just above described, and is broken to close the clutch, by one branch 383 of a forked link having also another branch 384. The forked link or pusher terminates at its front end in a finger button or key 385 by pushing which the machine may be started, if desired. In practice this button is used only occasionally, the clutch being controlled in its ordinary operation by the fork 384 being pulled rearward automatically. Said fork 384 is connected to a lever 386 pivoted on a fixed post 387. Said lever has a branch 388 operated by a link 390 pivoted to a lever 391 fixed on a rock shaft 392. Said lever 391 is connected by a link 393 with a universal bar 394 pivoted on a rod 395, fixed to the framework of the machine. This universal bar is rocked by several different control means leading over to the tabulator, as will be described in detail hereinafter.

The construction is such that if the lever 391 be rocked counter-clockwise in Fig. 19 either by an action of the link 393 or by the rocking of the shaft 392, it will pull the lever 388, 386 which, through forked link 384, 383, will break the toggles and close the clutch.

*Card feed*

The card feeding mechanism of the punch is substantially identical with that disclosed in the Lopez patent. The card picker 152 is reciprocated by an arm 400 on a rock shaft 401 (Fig. 5) which has thereon outside the framework (Figs. 3 and 19) an arm 402 connected by a link 403 to a lever 404 having a follower roller acted on by the card feed cam 406 against which the follower is pressed by a strong spring. The link 403 has in it a notch for engagement by a latch or lock 407 fast on a rock shaft 408, said rock shaft having thereon inside the machine another arm 410 (Fig. 5) a stud 411 on which engages in a slot in the lower end of a link 412. Said link 412 extends upward and has near its upper end a pin 413 acted upon by the horizontal arm of a bell-crank 414 pivoted on the shaft 392. The bell-crank 414 is controlled in its movement from the tabulator in a manner to be described hereinafter. However, the construction is such that if the bell-crank 414 be rocked counter-clockwise in Fig. 19, it will lift the link 412 and free the card picker from the restraint of latch 407. The stud 411 is held in the upper end of the slot by a spring 415 so that in case the link 403 is under strong spring tension at the time the link 415 is raised, this spring can stretch and will snap the lock out of engagement at the proper time. It may be remarked that the timing of the card feed is such that when in the first half of the total cycle the punches are down the card chamber is empty, and a card enters it in the latter half of the cycle when the punches are up, said card then being punched in the first half of the next cycle. The card is started by the picker at around 8° and is arrested by the card stop at about 258°. Said stop is opened at about 140° and is closed by 222°.

Card stop

Just outside the left hand base frame 131 (Fig. 3) the rear cam shaft 142 has thereon a cam 420 which controls the card stops through a follower arm 421 fast on a transverse rock shaft 423. The shaft 423 extends through the machine (Fig. 5) to the right hand frame plate 136 and it has fast on it two arms 424, each having pivoted thereto a link 425 pivoted to an ear 426 formed off from the sliding card stop 427. Said card stop consists of a bar of sheet metal mounted on the outside of the frame 160 of the die section of the machine and slidable up and down on headed screws 428. One of these screws has a stud to anchor a spring 430, normally pulling the stop upward. This whole construction is of an ordinary and familiar kind and is, therefore, only partially illustrated.

Retract mechanism

This has been changed radically from that disclosed in the Lopez patent.

In the Lopez machine the gag bars were so controlled that the set-up of any desired ones could, if desired, be preserved for use on a subsequent cycle or cycles of the machine. This mode of operation was utilized for punching the designation taken from the first card of a group, on the same cycle that the total appropriate to all the cards of that group was punched. Thus on the first cycle following each total or grand total operation, the designation was set up on the gag bars wherein it was retained until the end of the next following total or grand total operation as the case may be; the designation if for a total being punched along with the total it characterized, and if for a grand total being punched with the grand total it characterized as well as with the totals within said grand total.

In the instant machine the gag bars are restored to their normal positions during each cycle of the machine and the first card designations are stored for subsequent use in the set pins 165. This is accomplished by controlling the retraction of said set pins in the manner and by the means now to be described.

Figure 5:
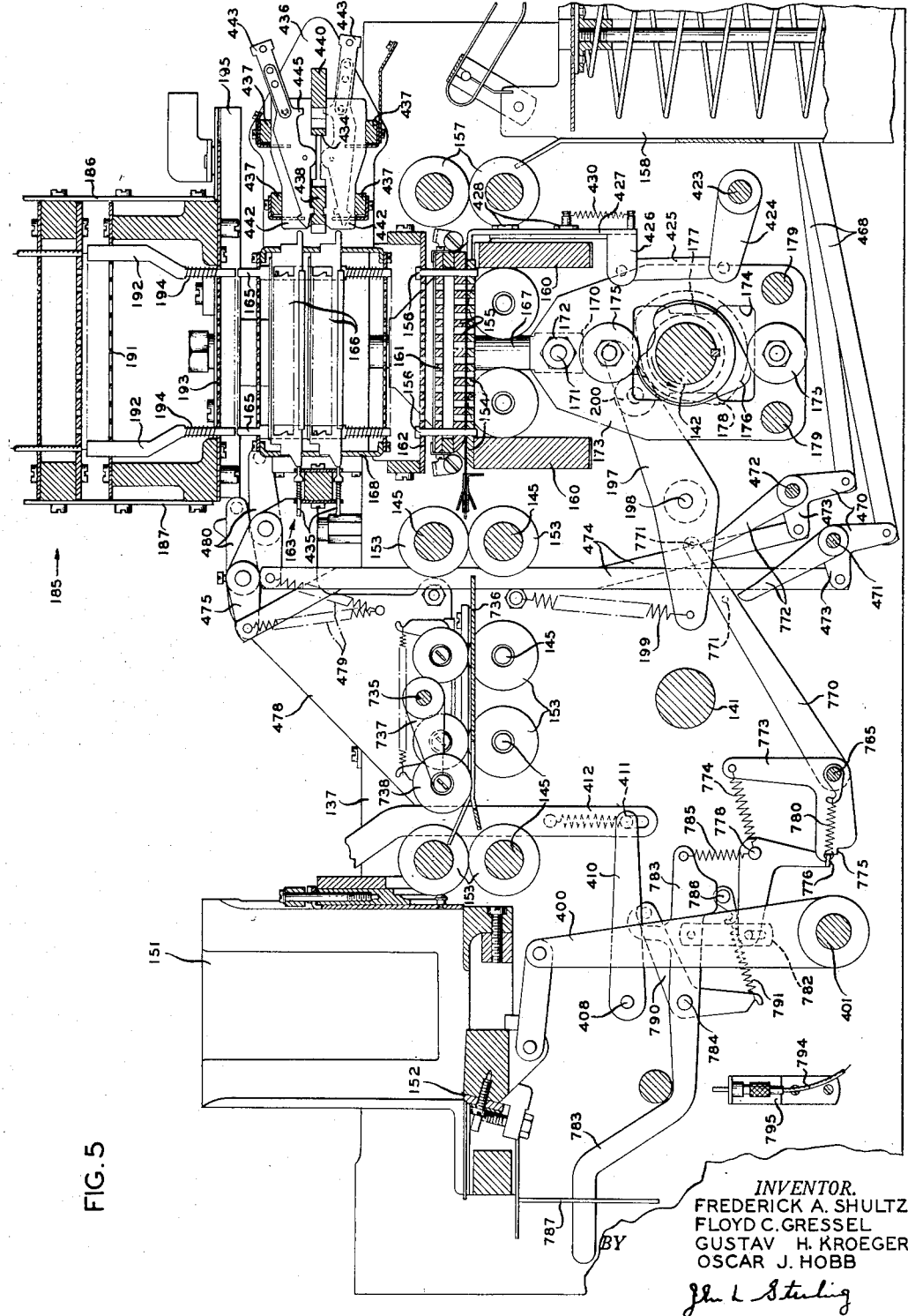
Fig. 5 is a front to rear sectional view of the base of the summary punch with the view taken from the right on a line approximately through the center of the machine.

The locking slides 166 (Figs. 5 and 9) for the set pins 165 are essentially of the construction usual in these machines, that is to say, each of the set pins has a stud adapted when the pin is depressed to be caught and held down by a latching shoulder on the slide 166, said locking shoulder being snapped over the stud by the usual spring pressed pin 435. The operation of retracting the set pins consists of momentarily pushing the slides 166 leftward in Fig. 5 to free said studs from said shoulders. The means for pushing the slides leftward in Fig. 5 is so designed as to control each column independently, a column referring to six pins. In Fig. 5 the upper slide 166 controls the six set pins for the upper zone of the card and the lower slide the six set pins for the lower zone.

Figure 9:
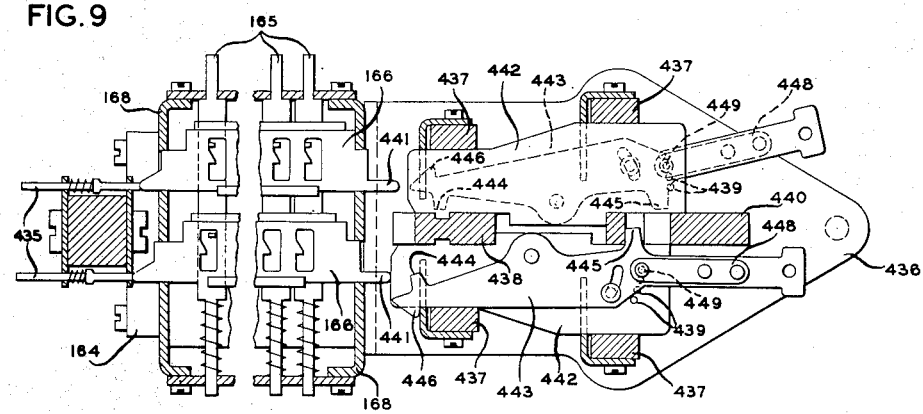
Fig. 9 is an enlarged sectional view partially broken away, of the set pin retract mechanism shown also in Fig. 5, the settable portions of this mechanism however being shown in positions different from those illustrated in the former figure.

The mechanism for retracting the locking slides selectively is mounted in a frame comprising right and left side plates 436 secured to the frame of the set pin unit and connected together by four transverse bars 437 and a fifth bar 434. Each of the end plates 436 has therein a pair of slots in which cross bars 438 and 440 are adapted to slide left and right in Fig. 5, that is to say, toward the front and the back of the machine. Each of the slides 166 has projecting from its rear end a finger 441 adapted to be pushed leftward by a small slide 442, there being two tiers of these slides, the upper tier for the upper slides 166, and the lower tier for the lower slides 166; and each of said slides 442 is adapted to act on one of the fingers 441 to move the proper slide 166 to set pin releasing position. The pusher slides 442 are guided in comb plates secured to the cross bars 437. Each of the pusher slides 442 has pivoted thereto a settable control member 443 having near its forward end a tooth 444 adapted to a longitudinal slot in the operating bar 438, and near its rear end a tooth 445 adapted to a notch 447 in the forward edge of the operating bar 440. If said settable member be rocked to the position where its tooth 444 engages the bar 438 (the upper one in Fig. 5), then that particular pusher slide will be locked to bar 438 and that column of set pins will be retracted at each cycle of the machine on which the said bar is operated; and if the tooth 445 be engaged with the bar 440 (the lower one in Fig. 5), then that particular pusher slide will be locked to bar 440 and that column of set pins will be retracted at each cycle of the machine on which the said bar 440 is operated. As shown in Fig. 9, the settable members 443 are movable also to a position wherein the associated set pins are never retracted and to another position wherein said set pins are permanently unlatched. The upper of the two settable members 443 shown in Fig. 9 is in the former of these positions with both teeth 444 and 445 disengaged from their operating bars so that the associated pusher slide is never operated. This setting is useful for permanently retaining certain information, such as a date, in the set pins 165. The lower settable member 443 in Fig. 9 is in the fourth mentioned position, having been pushed toward the front of the machine to the point where its pusher slide moved the locking slide 166 to unlocking position and then rocked to engage a projection 446 thereof over the forward fixed bar 437. Thus even though a set pin 165 in the associated column be depressed momentarily by the gag bar in the head of the machine, the set pin will not be locked down and no punching will occur.

In order to retain the settable pieces 443 in the positions to which they are set, each has secured to its side a leaf spring 448 from whose free end a detent pin 449 projects through the piece 443 into one of four suitably positioned holes 439 in the associated slide 442.

According to the invention means are provided for reciprocating the operating bars 438 and 440 selectively, so that data set up in a group of set pins controlled by one bar is not affected by the operation of the other bar to retract another group of set pins set up to represent some other information and connected with said other bar. For example, bar 438 may be utilized to retract those columns of set pins appropriate to the total, the total designation, and the grand total which, in the usual operation, occurs in the same columns as the total; and the other bar 440 may be used to retract the set pins in those columns appropriate to the grand total designation, which, it will be understood, it is desired to punch in each total card along with the total and its designation and also in the grand total card for the group of totals. In this instance, the bar 438 would be reciprocated to prepare the appropriate columns of set pins for a fresh set-up, following the punching of every total and also the grand total; but the bar 440 would be reciprocated only after punching the grand total as the set pins controlled thereby contain the grand total designation which is common to all of the total cards of that grand total group.

The means now to be described for controlling the bars 438 and 440, although capable of controlling the said bars in other ways, will be described as controlling them in accordance with the just above described mode of operation.

Figure 13:
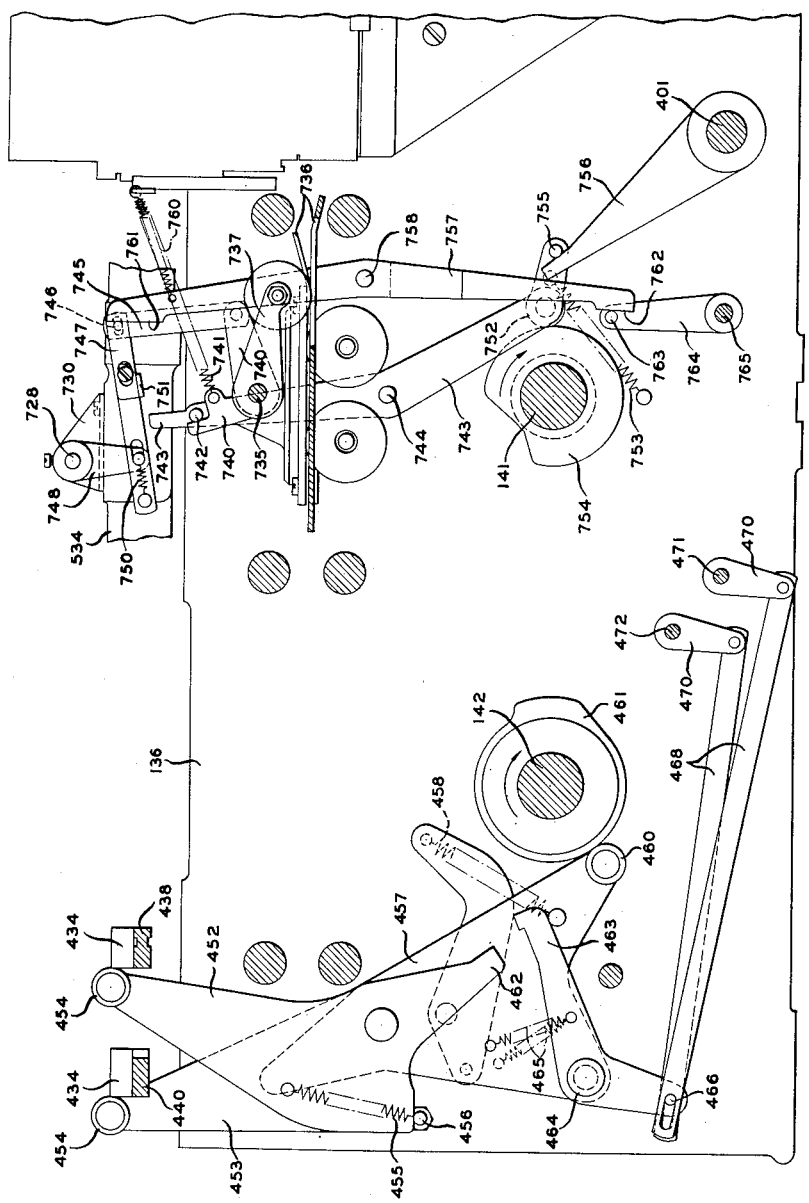
Fig. 13 is a front to rear sectional view from the left, of the base of the punch, with many parts omitted to clarify the construction of the retract operating mechanism and the misfeed mechanism.

Referring to Figs. 7 and 13, a bracket 450 bolted to the inner surface of base casting 136 supports a post 451 upon which are pivoted a pair of upright levers 452 and 453. The upper arm of each of said levers carries a roller 454, that on the former being adapted to engage the rear edge of the bar 438, and that on the latter, the rear edge of the bar 440. The bars 438 and 440 move up and down with the set pin unit, and to maintain an engagement between the rollers 454 and the said bars throughout the vertical travel of the bars, the latter have secured to their upper faces near either end a block 434. Springs 455 normally urge levers 452 and 453 counter-clockwise in Fig. 13 against a limit stud 456. Also pivoted on the stud 451 between the levers 452 and 453 is a follower lever 457 urged counter-clockwise by a spring 458, and carrying a roller 460 in contact with a cam 461 on the rear drive shaft 142. It is to be mentioned at this point that it is the cam 461 that is provided with the collar 177 (see also Fig. 5) which engages the finished edges 178 of the cutout 174 in the cam plate 173. The downwardly extending arms of the levers 452 and 453 are prolonged into fingers 462 adapted to be engaged by hooks 463 pivoted at 464 to opposite sides of the follower lever 457. Normally the hooks 463 are held out of engagement with their fingers 462, but as presently to be described, are movable selectively by springs 465, into engagement with said fingers, providing, in effect, a rigid lever between roller 460 and either or both of the rollers 454.

Each of the hooks 463 is in the form of a bell-crank whose depending arm has a pin 466 engaging in a slot 467 in a forwardly extending link 468, said link acting through said pin to hold the hook out of engagement with its finger. The links 468 are connected at their forward ends with arms 470 secured, one on a rock shaft 471 and the other on a rock shaft 472. Rock shaft 471 controls the hook 463 for lever 452 and rock shaft 472 the hook for lever 453. It will be seen that if either of these shafts be rocked counter-clockwise in Fig. 13 the associated hook 463 will be swung into engagement with its finger 462 by the appropriate spring 465. The levers 452 and 453 and their cooperating parts are repeated on the opposite side of the machine (Fig. 5) just inside the base casting 137 so as to actuate both ends of the bars 438 and 440 in unison, and the shafts 471 and 472 extend across the machine to control the hooks 463 of both sets of levers 452, 453.

The construction is such that at the proper time in the cycle, the humps of the cams 461 rock the levers 457 clockwise in Fig. 13, and if either pair of hooks 463 are in engagement with their fingers, the appropriate levers 452 or 453 actuate the bar 438 or 440 and retract the set pins controlled thereby.

Figure 14:
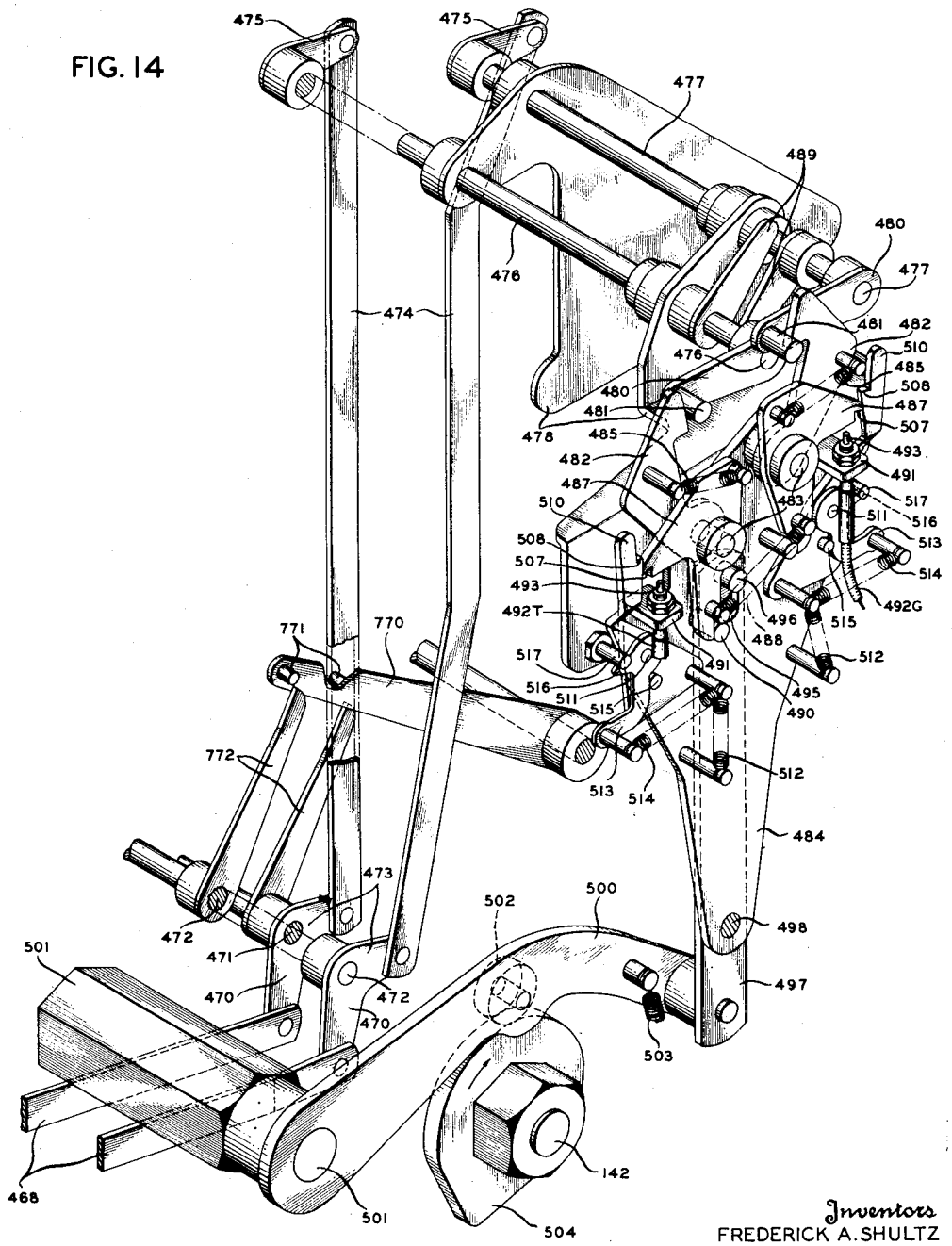
Fig. 14 is a partially exploded perspective view from above and to the rear, of other control mechanisms located at the left hand side of the punch.

At the left hand side of the machine (Figs. 5 and 14), the arms 470 fast on shafts 471 and 472 are the depending arms of bellcranks whose horizontal arms 473 are connected by upwardly extending links 474 each with an arm 475 fast on a short rock shaft 476 or 477, the former being associated with the shaft 471 and the latter with the shaft 472. The links 474 are pulled downward by springs 479, said springs normally holding the shafts 471, 472, 476 and 477 in their counter-clockwise position (Fig. 5). The action of each spring 479 is limited by the engagement of an arm 489 fast on the associated shaft 476 or 477 with the other of said shafts (Fig. 14). The shafts 476 and 477 are journalled in suitable brackets 478 mounted atop base casting 137, and at its outer end each has secured thereon an arm 480. Each arm 480 has projecting laterally from its free end a stud 481 adapted to be engaged and pulled down by a hook member 482 pivoted at 483 on a vertical slide 484 (see also Fig. 3). Each hook member is tensioned by a spring 485 toward the associated stud 481 and against a limit stud projecting from a bellcrank 487 pivoted coaxially with said member. The bellcranks 487 are drawn in opposite directions to maintain both hook members disengaged from the studs 481 by a common spring 488, such movements being limited by the engagement of the depending arms of the bellcranks with studs 490 projecting from the slide 484. Beneath the horizontal arm of each of the bellcranks 487 is an ear 491 of slide 484, said ear having secured thereto the casing of a Bowden 492T or 492G whose plunger 493, when actuated, acts on the said horizontal arm of the bellcrank to engage the hook member 482 with its stud 481. Means to actuate the Bowden 492T at the beginning of each total and grand total cycle, and the Bowden 492G at the beginning of each grand total cycle will be described hereinafter.

For guidance in its up and down movements, the slide 484 has therein a vertical slot 495 (Figs. 3 and 14) through which projects a headed stud 496 secured in the outer bracket 478. The stud 496 also passes through a similar slot in a heavy link 497 which extends downward alongside of the slide 484 and to which the lower end of said slide is secured at 498. At its lower end the link 497 is pivotally connected to the free end of a follower lever 500 pivoted on a stud or post 501 projecting from base casting 137. The lever 500 carries a roller 502 pressed by a spring 503 against a cam 504 on the rear drive shaft 142. The timing of this cam is shown on the time chart (Fig. 23).

Assuming for the moment that one of the Bowdens 492 is actuated at the beginning of a total or grand total cycle of the punch, it rocks the bell-crank 487 clockwise (Fig. 14) and tensions the hook member 482 against its stud 481. However, the hook member 482 is, along with the slide 481 in its lowermost position at such time and does not engage over said stud. When the cam 504 raises the slide 484 at about 124° to 152° of cycle (Fig. 23) the said hook member snaps over its stud, and when the slide moves downward between 158° and 175° the hook pulls the stud 481 down with it rocking the shaft 476 or 477. As described hereinbefore this pulls the appropriate links 474 and 468 and allows the spring 465 (Fig. 13) to tension the associated hook 463 into contact with its finger 462. However, referring to the time chart (Fig. 23), it will be seen that the roller 460 is at that time engaging the high part of the retract cam 461 so that lever 457 is in its operated position and the hook 463 is not able to engage the finger 462, but rather is tensioned against the lower edge thereof. Between 180° and 195° the lever 457 returns to normal position and the hook 463 is snapped into engagement with its finger 462. Between 15° and 25° of the following cycle the data in the set pins 165 is punched in the card. Assuming that the hook 463 remains in engagement until about 125° of the said next cycle, when the retract cam 461 again rocks the lever 457 clockwise, the appropriate retracting bar 438 or 440 is operated and the associated set pins are retracted. However, as will appear hereinafter the means which actuates the Bowdens 492 is restored before such time, and, therefore, means are provided to hold the hook members 482 in engagement with the studs 481 for a period of time after the Bowdens 492 have been restored.

The horizontal arm of each of the bell-cranks 487 is formed at its end with a shoulder 507 which, when the bell-crank is rocked clockwise by its Bowden 492, is engaged by a shoulder 508 on a lever 510 pivoted to the slide 484 at 511. The lever 510 is rocked to engage the bell-crank by a spring 512, connected to the lower arm of the lever. Also pivoted to slide 484 at 511 is an L shaped trip member 513 tensioned by a spring 514 counterclockwise (Fig. 14) against a limit stud 515 in the lower arm of lever 510. Adjacent the pivot 511 the member 513 is provided with a nose 516, which by engagement with a stud 517 fixed in the outer bracket 478, acts to trip the latching shoulder 508 free of shoulder 507 in the following manner.

Assuming again that one of the Bowdens 492 is actuated at the beginning of a total or grand total cycle, the latching shoulder 508 will snap under the shoulder 507 of bell-crank 487. During the upward movement of the slide 484 between 124° and 152° the nose 516 engages the stud 517 and through the stud 515 rocks the latch free of the bell-crank. However, as the Bowden 492 is still actuated said latch snaps back into engagement as soon as the nose passes said stud. During the downward movement of the slide, the nose 516 again engages the stud 517 but stretches the spring 514, and does not affect the latch 510. As described hereinabove the hook member 482 when in its upper position snaps over the stud 481, and during the downward movement of the slide pulls said stud downward. As will be described hereinafter, it is during the early part of the second cycle, while the hook member 482 is holding the stud 481 down, that the pressure on the Bowden 492 is relieved. On the next upward movement of the slide, the latch 508 is again disengaged from the bell-crank 487 and the horizontal arm of said bell-crank, due to the relaxed condition of Bowden 492, rocks a short distance downward, preventing the latch from reengaging after nose 516 passes stud 517. Hook member 482, however, remains in engagement with its stud 481 due to the friction between the parts. At the uppermost position of the slide and, therefore, of the hook member 482 this friction is relieved and the spring 488 disengages the hook member from its stud 481 and the hook member is normalized. The stud 481, however, does not immediately rock back to its normal position due to the friction between the hook 463 and its finger 462 (Fig. 13), the lever 457 and the hook 463 at that time (152° to 158°) being in their operated positions with the appropriate bar 438 or 440 retracting the set pins controlled thereby. When cam 461 allows lever 457 to return to normal position between 180° and 195° the hook 463 snaps out of engagement with said finger and the entire mechanism is normalized.

It results from the foregoing that the bar 438 for retracting the total, the grand total, and the total designation is operated on the cycle following each total and grand total cycle, and the bar 440 for retracting the grand total designation is operated only on the cycle following each grand total cycle.

*Control unit*

Most of the functions of the punch are controlled from the tabulator, and most of the control mechanism in the tabulator is included in a control unit mounted on the left hand side thereof. This control unit is substantially identical with that disclosed in the patent to Lopez. The framing of the unit includes (Figs. 15 and 16) a horizontal bar 525 mounted on two cast brackets 526 bolted to the web of the tabulator side frame piece 527, and a plate 528 located closer to the tabulator frame than the bar 525 and connected to the latter by a post 530. Plate 528 also is secured to a fixed plate 531 of the tabulator framing.

A pair of horizontal frame plates 532 extend out leftward from the plate 528, to which they are bolted, and are rigidly connected together by a post 533.

Figure 15:
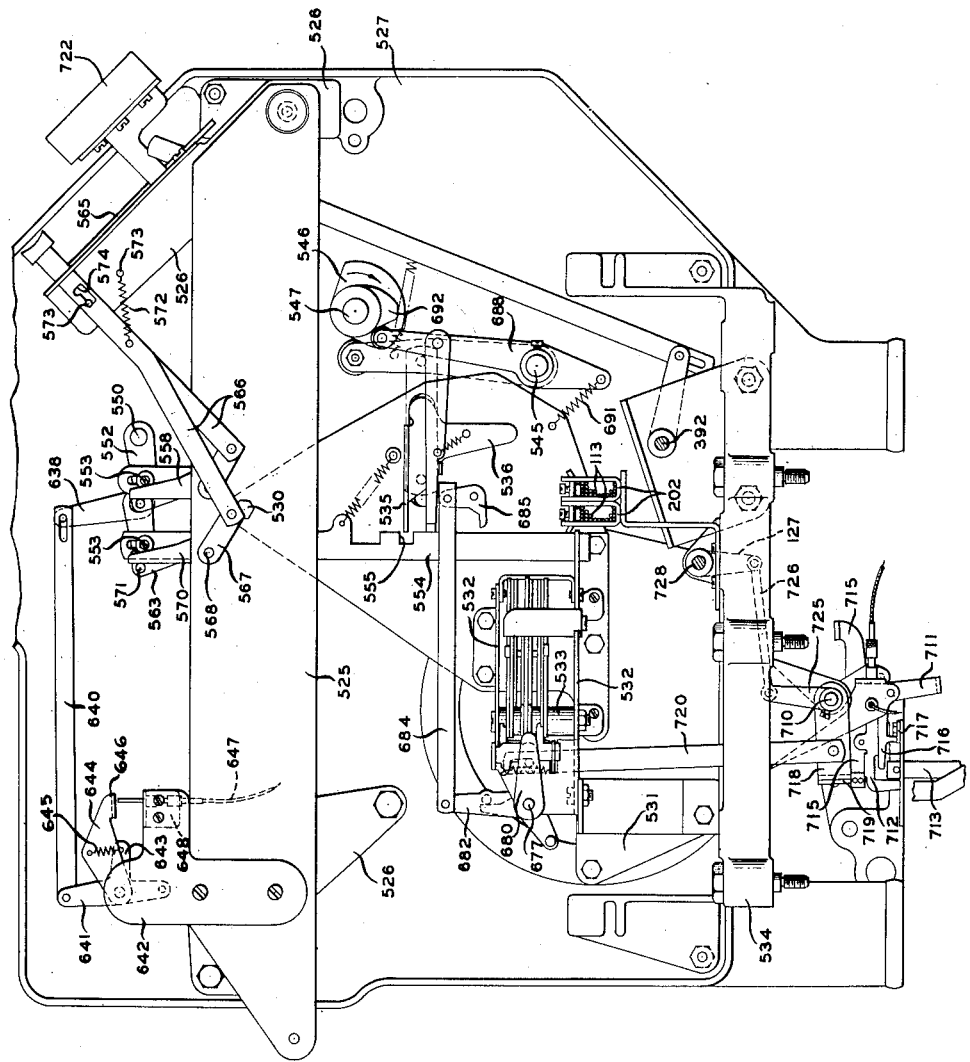
Fig. 15 is a general side view of the control unit attached to the left hand side of the tabulator.

The frames of the tabulator and of the punch are rigidly connected by a heavy casting 534 (Figs. 2 and 15).

*Actuator*

The power for sending the signals over to the punch is furnished by what amount ostensibly to a sort of universal bar 535 (Figs. 15, 16 and 18) which, at predetermined points in a cycle, is moved a short distance toward the rear of the machine, and later returned to its normal position shown in the drawings.

Several interponents are provided which at suitable times are moved into the path of this bar and thereby actuated, and said interponents operate the control or signaling device. The bar 535 is a portion of the piece consisting of a vertical plate 536, having the outline shown in the drawings and having its upper part formed off horizontally, the bar 535 consisting of the rear edge of this horizontal shelf. Said piece 536 is conveniently mounted for sliding motion on the frame plate 528. The means to this end consists of three studs 537, 538 and 540, projecting rightward from the vertical part of the piece 536, the first two into a slot 541 and the last into a shorter slot in said frame plate 528, said slots guiding the horizontal movements of the actuator. As shown, an additional plate 542 is riveted to the plate 528, and it has in it narrower slots registering with those in the plate 528, and the studs 537, 538 and 540 have reduced ends passing through those narrower slots, said ends having notches to receive spring clips to prevent endwise motion of the studs. The two upper studs 537 and 538 are in horizontal alignment, but the lower one is in a downwardly extending arm or prolongation of the piece 536, so that the whole actuator is on a three point support and is properly supported and guided. The stud 537 is made a little longer than the others and it is connected by link 543 with a follower lever 544 pivoted on a fixed stud 545. At its upper end lever 544 carries a follower roller pressed against a cam 546 fast on the end of the front main drive shaft 547 on the tabulator.

Interponents

The interponents consist of a plurality of upright bars, each appropriately controlled at its upper end, and each guided at its lower end in one of several slots 548 in the lower horizontal frame plate 532 (Fig. 16).

The tabulator has four control shafts of which two are shown, viz., a total shaft 550 and a grand total shaft 551. Each of these shafts projects a suitable distance beyond the web of the frame piece 527 and has fast on its end an arm 552 having a stud 553. Figs. 15 and 16 show the total interponent bar 554, which is the second of the illustrated interponents counting from the frame plate 528. The front edge of this bar 554 lies just back of the actuator bar 535, its upper end being offset toward the front of the machine to bring it into line with the stud 553 of the total shaft 550, which stud passes through the bar, so that the latter is lifted a short distance when, shortly before a total cycle, the shaft 550 is rocked. This bar is made with a notch 555, so located that normally it registers with the actuator 535, which, when it moves rearward, merely enters the notch and does not operate the bar. When, however, the total shaft is rocked and the bar is lifted, a part of the total bar 554 stands behind the actuator bar so that it is operated by the latter, that is to say, it is swung rearward about the stud 553 as its pivot. When so swung it operates a link 556, the connection of which will be described hereinafter. It may be mentioned that bar 554 has a cut-out into which a pin 557 projects from the plate 528 to limit the up and down motion of the bar.

A hook 558, pivoted to the bar 554, at 560 and influenced by a spring 561, is caught over the stud 553 and completes the vertical connection with said stud. As shown in Fig. 16, the bar 554 would be operated, but if the hook 558 were swung to releasing position, as shown in Fig. 15, then the bar 554 would not be operated and would transmit no signal.

This hook is controlled from a keyboard, as will be hereinafter described, so that in setting up the machine for a particular piece of work this total interponent 554 may be set active or inactive, as desired.

The grand total bar 562 is in all respects like the total bar 554, except that it goes straight up to its stud 553. It is also controlled by a hook 563 (Fig. 15) like the hook 558, and, as will hereinafter appear, this hook is settable from a keyboard to render the grand total bar active or inactive. The lower end of the bar 562, as shown in Fig. 17, is adapted to operate a link 564.

Other interponents may be provided to accomplish other functions in the manner disclosed in the Lopez patent. However, only the total and grand total interponents are illustrated and described herein.

In the drawing (Fig. 15) and inclined branch of the forward bracket 526 has screwed to its upper surface a keyboard plate 565 perforated to guide the stems of control keys 566 arranged in two rows. In the present instance only two keys are shown, namely, the grand total and total keys which control the grand total interponent 562 and total interponent 554, with respect to active and inactive. When these keys are up, said interponents are inactive, as shown in Fig. 15. When the grand total key is depressed, its stem 566 rocks an arm 567, fast on a stub shaft 568 passing through the heavy frame bar 525, and having on its inner end an upright arm 570 normally bearing against a stud 571 on the hook 563, and holding said hook out of engagement, and, therefore, the interponent 562 inactive, but when the key is depressed, the arm 570 frees the hook 563 which is moved into engagement by its spring 561, thus making said interponent active.

In like manner, depressing the total key rocks an arm like the lever 570 and makes the total interponent 554 active, that is to say, the hook 558 is moved into position to cause said interponent to be raised when the total shaft 550 is rocked.

Each key stem 566 is influenced by a spring 572 anchored to one of several studs 573 (Fig. 15), projecting from the frame casting 526. One of these studs passes through a slot 574 in each of the key stems 566, said slot having offsets at its upper and lower ends, and the tension of said spring tends to hold the key stem with the stud 573 seated in one of said offsets.

Assuming that the grand total key is depressed, then when the grand total shaft 551 is rocked preparatory to the grand total cycle of the tabulator, the grand total interponent 562 is raised to effective position, and when, at the beginning of the grand total cycle, the actuator 535 (Fig. 16) is pushed toward the rear of the machine, it pushes rearward the link 564 (Fig. 17) which rocks a horizontal bell-crank 575. Said bell-crank, through a stud 576, rocks another bell-crank 577, pulling rightward on a long link 578 which is one of several links extending from the control unit of the tabulator over to and substantially through the punch (Fig. 19). As disclosed in the Lopez patent, there may be several of these links, but in the present instance, three are shown one above the other, the link 578 being the uppermost one.

The bell-cranks 575 and 577 are, respectively, the uppermost and the second one of several bell-cranks which are pivoted one above another on the frame post 533 hereinbefore described.

The left hand ends of these control links are shown in Fig. 19 which is an isometric view looking downward from behind and at the left of the punch. At its end, the link 578 is connected to a three armed lever 580 pivoted on the same rod 395 as the universal bar 394. Said lever has an arm 581 which, when the link 578 is pulled by the tabulator, rocks the universal bar 394 and trips the clutch of the punch, as hereinbefore described.

Referring to Fig. 19, the universal bar 394 consists of a small bail and projecting arm, the two branches of the bail being pivoted on the rod 395. Referring to Fig. 3, the left hand frame piece 140 includes a cross bar 582 having in its web an opening 583 which serves to accommodate some of the mechanism shown in Fig. 19. In this small scale figure no effort has been made to show the movable parts except that the link 578 is shown in end view as the top one of three such links coming in from the tabulator. The pivot rod 395 stands just outside the frame bar 582, being mounted at its lower end on a bracket 584 and at its upper end on a bracket 585.

Total signal

The parts of this included in the control units on the tabulator are shown in Fig. 16 and include the interponent 554 occupying the second from the right of the four slots 548 in the plate 532. When this interponent has been raised by the operation of the total shaft 550 and is operated by the actuator 535, it pushes on link 556 which rocks a bell-crank 586, pivoted on the post 533. Bell-crank 586 has a stud 587 which rocks a lever 588 just beneath said bell-crank, and this lever 588 operates a long link 590 which goes over to the punch, being the third link from the top in Fig. 19. This link operates a bell-crank 591 in all respects like the bell-crank 580 hereinbefore described, with the effect among other things that it rocks the universal bar 394 and trips the clutch to start the punch.

The levers pivoted on the rod 395 and operated from the tabulator also actuate a number of Bowden wires to control certain functions of the machine. Two of these wires terminate at a sheet metal frame 592 (Figs. 3 and 4) secured to the inside face of the cross frame bar 582. This frame comprises parallel front and rear sheet metal walls 593. One of said Bowdens is the Bowden 344 (Fig. 11) which, as described hereinabove, actuates the controls for the total releasing bar 307. The other Bowden, designated 594, is utilized to control means to be described hereinafter, for actuating the Bowden 360 (Fig. 12) whose function it is to actuate the operating control means for the designation releasing bar 308. The Bowden 344, which controls the total releasing bar 307, has its casing anchored in the rear wall 593 and is actuated by a block 596 having a pin 595 slidable in the rear wall 593 and two pins 597 projecting through and slidable in the front wall 593, said pins 597 being operated by rearwardly extending arms of the levers 580 and 591 (Figs. 19, 20, and 21). Either of these levers when operated will push the block 596 and operate the Bowden 344.

In order for the grand total lever 580 and total lever 591 each to actuate the appropriate Bowdens 492, G or T (Fig. 14) to effect retraction of the grand total and total and their designations, the following mechanism, which is substantially identical with the mechanism used for controlling the gag bar clearing mechanism in the Lopez machine, is provided (Figs. 19, 20 and 21).

The ends of these two Bowdens 492G and 492T are anchored to a sheet metal bracket 598 in position to be actuated by the horizontal arms of bell-cranks 600 and 601 conveniently pivoted on the shaft 392 hereinbefore described. The bell-crank 600 is operated by a link 602 (Fig. 20) pivoted at 603 to a rear arm of the lever 580. The link 602 is shown extending horizontally and then having an ear or finger 604 bent downward therefrom and articulated with the bell-crank 600. The bell-crank 601 is operated by an ear 605 bent down from a similar link 606. These ears 604 and 605 are bent down from their respective horizontal links in different planes in order to reach their respective bell-cranks.

In order to actuate the Bowden 492T at the beginning of a grand total cycle to effect retraction of the grand total on the next following cycle, as described hereinbefore, the total link 606 (Fig. 21) is provided with a shoulder 599 lying in the path of a rearward prolongation of the down turned ear 604 of the grand total link 602. Thus when link 602 is pulled rearward it pulls the link 606 rearward with it.

From all of the above it follows that when the total link 590 from the tabulator is operated, its three armed lever 591 closes the clutch to start the punch at about 30° of tabulator cycle, releases the gag bars appropriate to the total, and sets the retract mechanism to retract the total and its designation, all as described hereinbefore. And when the grand total link 578 is operated, the operation is the same, except that the retract mechanism is set to retract the grand total designation also.

The Bowden 594 (Fig. 4) is, as mentioned above, associated with the first card designation releasing bar 308 and when actuated sets the machine to pick up the designation from the first card after total or after grand total, as the case may be; but this mode of operation is not always desired. Means are, therefore, provided whereby this Bowden 594 may be operated by both of the levers 580 and 591, by either of them, or not at all, as desired. A settable piece 607 is mounted by pin and slot on top of the link 602. This piece 607 is slidable leftward to an active position and rightward to an inactive position. As shown, a disabling button 608 of familiar construction has its casings secured to the piece 607 and a plunger that can be set into either one of two holes in the link 602. The total link 606 has the same parts except that here the settable piece 609 is underneath the link and the disabling button projects downward.

In the bracket 592 (Fig. 4) is a second block 610 which operates the first card designation Bowden 594, and this block has a pin 611 slidable in the rear wall 593 and two pins 612 projecting through the front wall 593 in position to be operated by the settable pieces 607 and 609 when said pieces are set active. When these pieces are set inactive the pins 612 are beyond their range of movement, all as in the Lopez machine.

According to the invention the first card designation Bowden 594 extends across the back of the punch to the right hand side thereof to initiate an operation of a control mechanism whose purpose it is to actuate the Bowden 360 (Fig. 12) hereinbefore described, on the appropriate cycle of a punch operation and on none other. This control mechanism is mounted on a large sheet metal plate 613 (Fig. 22) having an ear 614 bolted to the lower flange of the right hand base frame plate 136. The Bowden 594 has its casing secured to an ear 615 of the plate 613 and the plunger thereof projects through said ear into engagement with the rear edge of a horizontal slide 616. Said slide is mounted on front and rear headed studs 617 and 618, respectively, which project from the plate 613, the latter into an ordinary front to rear slot 620 in the slide and the former into a slot 621 which at its rearward end has an upward extension 622. The slide 616 has a laterally projecting stud 623 against which the depending arm of a bell-crank 624 is tensioned by a spring 625 in a direction to move the slide frontward, said bell-crank being pivoted on plate 613. A second spring 626, stronger than spring 625, is so situated as normally to hold the slide in its rearmost position, and also to pull down the front end of the slide to engage stud 617 in the upward extension 622 of slot 621 when the slide is in its forward position. Thus the slide is, in effect, a latch to hold the bell-crank 624 in the counter-clockwise positions shown in Fig. 22, which latch is tripped by Bowden 594. Engagement of stud 617 in said upward extension 622 locks the slide in its forward position.

The depending arm of bell-crank 624 is formed with an ear 627 in which is secured the casing of Bowden 360 which as described hereinbefore actuates the controls for the first card designation releasing bar 308. The plunger of Bowden 360 projects through ear 627 and stands normally to the rear of an ear 628 formed on the end of a follower lever 630 pivoted on plate 613 and carrying a roller 631 pressed by a spring 632 against the periphery of a cam 633 on the rear drive shaft 142. A headed stud 634 in lever 630 projects through a slot 635 in an upright link 636 which at its upper end is pivoted to the slide 616 just to the rear of slot 621 in the latter. The purpose of link 636 is to raise slide 616 to disengage the upward extension 622 of slot 621 from stud 617 and allow the spring 626 to restore the slide to its normal rearward position.

The construction is such that at the beginning of a total cycle of the punch the Bowden 594 is actuated as described above, and it moves the slide 616 frontward. At this time, referring to the time chart, the high dwell of cam 633 is engaging the roller 631 and the ear 628 is in its highest position, so that as stud 623 moves forward, the plunger of the Bowden 360 engages the edge of ear 628 and prevents further clockwise rocking of the bell-crank 624 by spring 625. Also, link 636 being in its upper position prevents the front end of slide 616 from being moved downward by spring 626 to engage stud 617 in the upward extension 622 of slot 621. At from 54° to 84° of cycle the ear 628 moves downward and the bell-crank 624 rocks clockwise moving the plunger of Bowden 360 over ear 628, such movement being limited by the engagement of the bell-crank's horizontal arm with an ear 637 of plate 613, the depending arm of the bell-crank not moving into engagement with stud 623. At the same time, link 636 moves downward, but idly as the Bowden 594 is holding slide 616 forward. When, at from 334° to 360° of the same cycle cam 633 moves the ear 628 upward, the Bowden 360 is actuated, and (Figs. 10 and 12) the interponent 332 appropriate to the first card designation releasing bar is latched down by arm 354. Then when actuator 330, 331 advances between 14° and 54° of the following cycle the designation releasing bars 308 are depressed and the designation from the first card after total is set up in the gag bars. The link 636 also moved upward between 334° and 360° of the first cycle (Fig. 22) so that the upward extension 622 of slot 621 was moved clear of stud 617. When, then, as will be described hereinafter the Bowden 594 normalizes early in the next cycle the slide 616 is pulled rearward by its spring 626 until the stud 623 therein engages the depending arm of bell-crank 624, which due to the friction between the plunger of Bowden 360 and the raised ear 628 halts the movement of the slide. However, the slide does move rearward sufficiently to move the upward extension 622 of slot 621 out of range of stud 617, so that when ear 628 moves downward between 54° and 84° and said friction is relieved, the slide is free to move to its rearmost or normal position.

In some instances, the total cycle is followed immediately by a grand total cycle so that the designation is not picked up by the gag bars until the third cycle of the punch.

With the mechanism thus far described the first card designation releasing bars would, in such instance, be operated inopportunely on the second or grand total cycle, and it is to prevent this that the following means are provided.

In the tabulator (Fig. 15), the grand total shaft 551 where it projects through the left hand frame plate 527 has fast thereon an upright arm 638 connected by a rearwardly extending link 640 with the vertical arm of a bell-crank 641 pivoted on a bracket 642 secured to the control unit frame bar 525. The horizontal arm of bell-crank 641 has a stud 643 against which an arm 644 pivoted coaxially with the bell-crank is tensioned by a spring 645. At its free end, arm 644 is provided with an ear 646 normally overlying the plunger of a Bowden 647 whose casing is secured in a bracket 648 bolted to bracket 642.

The construction is such that ear 646 normally is free of the plunger of Bowden 647, but, when in the latter part of a total cycle the grand total shaft 551 rocks clockwise in Fig. 15, the bell-crank 641 is rocked clockwise along with it, moving the stud 643 downward and through spring 645, pulling arm 644 downward, the ear 646 of said arm actuating Bowden 647.

At its other end the casing of Bowden 647 is secured to a bracket 650 (Figs. 2 and 22) mounted on the frame plate 613, with its plunger above the edge of an arm 651 pivoted on a stud 652 projecting from plate 613. The arm 651 is drawn clockwise against the said plunger by a spring 653 and at its free end is bent off laterally and has secured thereto in the present instance two Bowdens, namely, 654 and 655, the plungers of these Bowdens are normally located above an ear 657 on the end of a lever 658 pivoted on a post 660 projecting from frame plate 613. Beyond its pivot lever 658 carries a roller 661 pressed by a spring 662 against the periphery of a cam 663 on the rear drive shaft 142.

Figure 22:
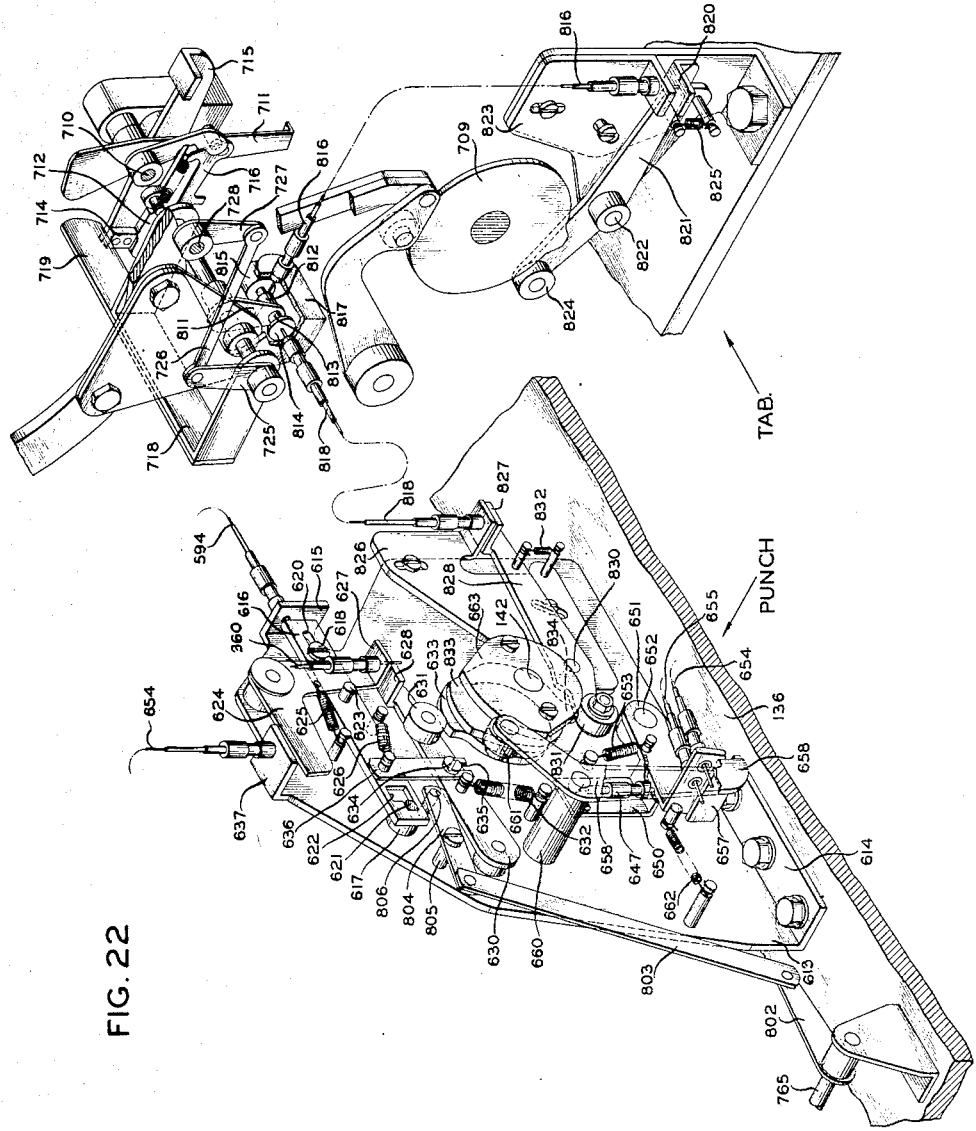
Fig. 22 is a compound perspective view of control mechanisms located on the right hand side of the punch and on the left hand side of the tabulator, said machines being illustrated as standing at an angle to one another for the purposes of the view.

The construction is such that if the Bowden 647 be actuated, it rocks arm 651 counter-clockwise (Fig. 22) bringing the plungers of Bowdens 654 and 655 into position to be actuated by ear 657 when the hump of cam 663 rocks the lever 658 counter-clockwise (Fig. 22).

The Bowden 655 is utilized for a purpose to be described hereinafter, and takes no part in the operation presently under discussion. The Bowden 654, however, does take part in the present operation and has the other end of its casing secured in the ear 637 of plate 613 directly above the horizontal arm of bell-crank 624. An actuation of Bowden 654 will, therefore, rock bell-crank 624 counter-clockwise moving the plunger of Bowden 360 out of the path of ear 628 so that said Bowden 360 is not actuated by the rise of said ear.

The operation is as follows:

At the beginning of the first or total cycle of the punch the Bowden 594 (Fig. 22) is actuated by the total signal from the tabulator and pushes the slide 616 rearward. Between 54° and 84° of cycle the ear 628 moves down and the Bowden 360 moves into position to be actuated by said ear as it rises between 334° and 360°. However, in the latter part of the total cycle the grand total shaft 551 in the tabulator (Fig. 15) rocks and Bowden 647 is actuated. In the punch (Fig. 22) this rocks arm 651 counter-clockwise moving the plunger of Bowden 654 into the path of ear 657 which is rocked to actuate said Bowden 654 between 310° and 330° of cycle. Thus by 330° the Bowden 654 has rocked bell-crank 624 counterclockwise to move Bowden 360 out of the path of ear 628, so that the rise of said ear between 334° and 360° does not actuate said Bowden 360. At the end of the total cycle the grand total signal from the tabulator takes over control of Bowdens 654 and maintains the same actuated so that the slide 616 remains in its forward position during the second or grand total cycle. Between 60° and 90° of said second cycle the ear 657 rocks back to its non-actuating position, so that when in the latter half of the grand total cycle of the tabulator the grand total shaft 551 rocks back to normal it restores the Bowden 647 and allows the arm 651 to rock the Bowden 654 out of the path of ear 657. Between 334° and 360° of the second cycle cam 633 raises ear 628 and actuates Bowden 360, which as described above initiates an operation of the first card designation releasing bars 308. In the early part of the third cycle the Bowden 594 is restored and the slide 616 moves rearward to its normal position the same as described above.

If the operation is grand totals only, then the first cycle of the punch would be the grand total cycle and the second cycle would be the first card designation cycle. The operation of the designation releasing bar control mechanism would be the same as for a total but a cycle later, the Bowdens 647 and 654 being operated idly and not affecting the operation.

Other controls, operable under special conditions are provided for the designation releasing bars 308 and will be described hereinafter.

In order that the total and grand total signals from the tabulator can be maintained after the total and grand total shafts, respectively, have returned to normal, two brackets 670 (Figs. 15 and 16) are fastened to an ear 671 of the frame plate 532 and carry a total latch 672 and a grand total latch 673 (see also Fig. 17), the former being provided with a nose 674 to cooperate with an arm of the total bell-crank 588, and the latter with a nose 675 to cooperate with the grand total bell-crank 577. Said latches extend through slots in the brackets 670. The nose of each latch is under-cut at its end to provide a shoulder adapted to hold its respective bell-crank in operated position.

In the normal position of the parts (Figs. 16 and 17), the bell-cranks underlie the noses 674 and 675 which are tensioned downward against the bell-cranks by springs 676. But if, for example, the total bell-crank 588 be rocked by the stud 587, that portion thereof that cooperates with the latch 672 will move out beyond its shoulder and the latch will snap down, putting said shoulder and bell-crank in the same horizontal plane. When the pressure on bell-crank 588 by the stud 587 is relieved, the bell-crank will move back against the shoulder.

It results from this construction that when the total or grand total linkage is pulled operating the universal bar 394 (Fig. 19), the link 383 breaks the clutch toggles, thus closing the clutch and starting the machine, and when the actuator 535 (Fig. 16) returns to its normal position the linkages move back a short distance toward normal position, but are still held sufficiently operated so that the link 383 maintains the toggles sufficiently broken so that they are unable to stop the machine at the end of the first cycle.

Suitable means are provided to trip these latches 672 and 673. A rock shaft 677 is journaled in ear 671 and another ear 678 of the bracket 532, said shaft having an arm 680 from which a stud 679 projects under shoulders of the two latches so that if said shaft be rocked, the latches will be lifted and the total and grand total levers released from them. On its right hand end, said shaft has fixed a three armed lever 681 by the side of which is pivoted a loose arm 682 having a stud lying in front of an arm of the lever 681 so that if lever 682 be rocked counter-clockwise in Fig. 16, it will release the latches, but the shaft can be rocked by other means independently of the arm 682, and said arm 682 can be rocked in the opposite direction independently of the shaft. To the upper end of arm 682 is pivoted a push link 684 which at its forward end is mounted by pin and slot on a bell-crank 685 which as described in the Lopez patent, may be part of additional mechanism not shown or described herein. In the normal position of the parts shown in Fig. 16, the front end of the link 684 stands a short distance rearward of an ear 686 bent off from a link 687 pivoted to a follower lever 688. Said lever 688 is pivoted on the stud 545 and has a roller 690 pressed by a spring 691 against the periphery of a cam 692 connected by a hub 693 with the actuator cam 546 hereinbefore described. The link 687 extends backward beyond ear 686 and it has its rear end thickened and lying between the total interponent 554 and the grand total interponent 562, each of which has a stud 694 lying beneath (Fig. 18) and supporting said link. The construction is such that, with the parts in their normal position, if the link 687 were to move rearward, the ear 686 after a certain amount of lost motion, would push the link 684 and release the latches. However, when preparatory to a total or grand total cycle one of the interponents 554 or 562 is raised to its elevated position, its stud 694 will have raised the link 687, bringing the ear 686 above the link 684 so that the latches are not released at the beginning of a total or grand total cycle. The total and grand total shafts of the tabulator return to their normal positions in the latter part of their respective cycles, allowing the interponents 554 or 562 to descend so that at the ends of those cycles the ear 686 is in operative position.

As the two machines approach the end of the total cycle, the operation is as follows:

At that time the toggles in the clutch mechanism of the punch are held sufficiently broken so that when at around 360° of punch cycle the hump on the cam 372 (Fig. 19) operates the interponent 374 and the link 373, the machine will not be stopped. Meanwhile at perhaps 330° of tabulator cycle, the total interponent 554 has dropped back to normal position (Fig. 16) bringing the ear 686 into line with the link 684, and at around 358° (see Fig. 23) the link 687 begins to advance. The lost motion between the ear 686 and the link 684 is such that the latches 672 and 673 are not released by cam 692 until some time about 59° of tabulator cycle, which is some 29° of punch cycle, and after the clutch opening mechanism has already operated idly. The punch, therefore, continues to run for the additional cycle, but the lever 508 (Fig. 16) in the tabulator and the universal bar 394 (Fig. 19) in the punch return to normal position as soon as the latch is released, resulting in the straightening of the toggles so that at the end of the additional cycle the punch will stop. At the same time the pressure on the Bowdens 344, 492 and 594 is relieved with the results described hereinbefore.

If the operation is punching grand totals only, the mode of operation will be the same except that everything takes place one tabulator cycle later. In case of grand total following a total, the grand total interponent 562 is raised before the total interponent 554 is restored so that the link 687 is held up until the latter part of the grand total cycle which will, therefore, be followed by the additional cycle.

Other means to rock the shaft 677 to release the latches for other functions will be described hereinafter.

*Card feed control*

It will be recalled that in the punch the card feed mechanism is held normally disabled by the latch 407 (Fig. 19), which, through shaft 408, arm 410 and link 412 is connected with the bell-crank 414, a rocking of which will trip said latch. Said bell-crank is pivoted on the shaft 392 between the total and grand total bell-cranks 600 and 601, and like them has pivoted to its upstanding arm the bent off ear of a link 700, which extends rearward where it is connected to the rearmost arm of a bell-crank 701 pivoted coaxially with the universal bar 394. The other arm of said bell-crank 701 has pivoted thereto a long link 702 extending over to the tabulating machine between the total and grand total links 578 and 590. At its other end (Fig. 16) link 702 is connected to one arm of a bell-crank 703 pivoted on the stud 533 between the bell-cranks 575 and 586 (see also Fig. 17), and is arranged to be rocked by either of them.

Pivoted to the free arm of bell-crank 703 at 704 (Fig. 17) is an upper hook 705 normally engaging a stud 706 in the underside of the bell-crank 575 for the grand total, and a lower hook 707 (Fig. 16) normally engaging a stud 708 projecting upward from the bell-crank 586 for the total. The hooks 705 and 707 are made in the form of bell-cranks, the one arm of which constitutes a hook and the other arm of which is adapted to cooperate with other parts in disabling said hook. The purpose of and the means for disabling the hooks 705 and 707 are fully described in the Lopez patent, and as such is not material to the present invention, will not be described herein.

It will be noted that the hooks cooperate with the bell-cranks 575 and 586 which, after being rocked by the actuator 535, are not latched in operated position, but return to normal position with said actuator.

The construction of the mechanism thus far described is such that if the total or grand total bell-crank 586 or 575 is rocked to initiate a total or grand total operation of the punch, the card feed bell-crank will also be rocked and, during the total or grand total cycle, a card will be fed into the punch. However, as the actuator 535, and with it the bell-crank 586 or 575 returns to normal during that same cycle, the punch card feed will again be locked, and a card will not be fed during the second cycle. In the case of a total followed by a grand total, the card feed bell-crank will be rocked twice, once for the total cycle by the bell-crank 586 and again for the grand total cycle by the bell-crank 575, and as a result a card will be fed into the punch during each of said cycles.

*Starting and stopping both machines*

The tabulator is provided with a variety of automatic stop mechanisms, all as described in the aforementioned patent to Mueller, 2,381,361. The details of these mechanisms are not pertinent here and will not be described, it being sufficient for an understanding of the invention to know that each of said mechanisms, in order to stop the machine, imparts a clockwise rocking movement to the tabulator stop shaft 710 (Figs. 15 and 22).

An arm 711 is, in effect, fast on said shaft and has pivoted thereto an interponent 712. The interponent 712 is normally held in inactive position by a spring acting on shaft 710, but when moved to active position by the rocking of said shaft, is interposed between a plunger 713, which is reciprocated at the end of each cycle by the usual stop cam 709, and a block 714 on a heavy lever 715 which, when it is rocked about its pivot by the plunger 713, opens the clutch and stops the machine in known manner. In order to make it unnecessary to hold the shaft 710 rocked for any period of time, a latch 716 is pivoted to the interponent 712 and engages a block 717 on the framing to hold said interponent in its active position when it has been moved there by the rocking of shaft 710. The latch 716 is prolonged over the plunger 713 by which it is released from the block 717 to be restored to inactive position with the interponent 712.

As described in the Lopez patent, one of said automatic stop mechanisms might act to stop the tabulator at the end of a total or grand total cycle, at which times the punch is in the first or second cycle of a punching operation.

It will be remembered that the latches 672 and 673 (Fig. 16) hold their signal transmitting links 590 and 578 in operated position until early in the first item cycle following a total or grand total cycle, as the case may be, in order that the punch will run for an additional cycle during which the designation is set up on the gag bars. With the mechanism thus far described the latch 672 or 673 would not be tripped if the tabulator were stopped, but the punch would continue running for a succession of cycles until the tabulator was again started and the latches tripped. However, it would be almost impossible to start the tabulator by hand near enough to the correct point in the punch cycle for the two machines to cooperate properly and set up the designation on the gag bars. Therefore, means are provided to stop the punch whenever the tabulator is stopped.

Loosely mounted on the tabulator stop shaft 710 (Figs. 15 and 22) are the arms of a bail 718 whose cross bar has secured thereto an arm 719 overlying the block 714 on the heavy lever 715. An upwardly extending link 720 is pivoted to one arm of the bail and at its upper end has a slot which engages a pin 721 (Fig. 16) in the horizontal arm of the lever 681, which, it will be remembered, is fast on the shaft 677. At its other end shaft 677 carries the arm 680, which, through stud 679 trips the latches 672 and 673.

The construction is such that whenever the tabulator stop shaft 710 is rocked to stop the tabulator, the latches 672 and 673 are tripped through the linkage just described, and the punch stops at the end of its cycle, which it will be remembered, is some 30° later than the end of the tabulator cycle.

In order to start the machines in proper synchronism after they have been stopped by the means just described the tabulator start key 722 (Fig. 15) is depressed. This key immediately, starts the tabulator and, as described in the Lopez patent, effects, at the proper point in the cycle, the rocking of shaft 392 (Fig. 19) which extends clear over to the tabulator from the punch for this purpose. Rocking of this shaft breaks the punch clutch toggles through lever 391, link 390, lever 388 and link 383 the same as described hereinbefore, and the punch clutch closes at the appropriate time.

The automatic stopping of both machines at the end of a total or grand total cycle affects the first card designation control mechanism of Fig. 22 in the following manner: When at the end of the tabulator cycle, which is about 330° of punch cycle, the latches 671 and 672 (Fig. 16) are tripped, the pressure on Bowden 594 (Fig. 22) is relieved. However, spring 626 cannot restore slide 616 to its normal position due to the fact that the upper extension 622 of slot 621 in the slide is engaged by stud 617, and when cam 633 raises ear 628 between 334° and 360° the Bowden 360 is actuated. The punch stops at 360° but the Bowden 360 remains actuated, and when the machines are restarted the designation releasing bars 308 are operated during the first or designation cycle, and it is for just this contingency that the upward extension 622 of slot 621 is provided.

*Stopping both machines from the punch*

In the Lopez patent a plurality of means for stopping both machines from the punch are described. However, only one of these means affects the present invention, and only that one is shown and described herein.

In the tabulator (Fig. 15) the stop shaft 710 is provided with an upright arm 725 connected by a link 726 with a depending arm 727 fast on a shaft 728. The shaft 728 extends over to the punch, being journaled in brackets fastened to the casting 534 (Figs. 15 and 13).

The construction is such that if this shaft 728 be rocked counter-clockwise (Figs. 15 and 13) it will, through arm 727, link 726 and arm 725, rock the tabulator stop shaft 710 and cause both the tabulator and the punch to be stopped as described hereinbefore.

*Card feed failure*

It sometimes happens that a card fails to feed from the hopper, is jammed in the frontmost rollers, or for some other reason does not pass into the punch chamber in order to be perforated in accordance with the data received from the tabulator. In such event, the data to be punched in the card would be lost even if the machine were stopped, due to the fact that whereas another card cannot be fed into the chamber until about 258° of the following cycle, said data is cleared from the set pins 165 by 125° of said following cycle.

Therefore, in order to prevent data from being lost in this manner the following means are provided not only to stop both machines at the end of the card feeding cycle, which in the present instance is either a total or a grand total cycle, in the event of card feed failure, but also to prevent operation of the set pin retract mechanism and allow a card to be fed into the chamber during the next following cycle to be punched in accordance with said data.

To this end a shaft 735 extending across the space above a pair of plates 736 (Figs. 5 and 13), through which the cards pass before entering the punch chamber, has at about its center an arm 737 which carries a sensing roller 738 situated normally just above aligned slots in the plates 736. Near its right hand end said shaft carries a bell-crank 740 biased clockwise by a spring 741 and whose vertical arm stands behind a pin 742 in the upper end of a lever 743 of the first order pivoted to the framing at 744. The horizontal arm of said bell-crank supports an upstanding link 745, a pin 746 in the upper end of which engages in a slot in a link 747. This link 747 has a slot near its other end which is engaged by a pin in an arm 748 fast on the shaft 728, and said link is tensioned frontward by a spring 750 anchored to a pin on the link and the pin in said arm 748. At about its mid point the link 747 is provided with an ear 751 for cooperation with the upper end of lever 743.

The construction thus far described is such that if the lever 743 be rocked clockwise the vertical arm of bell-crank 740 will follow the stud 742 in said lever under tension of the spring 741, allowing the roller 738 to move downward into the slots in the plates 736. At the same time the rocking of bell-crank 740 will draw link 745 and, therefore, the link 747 downward, bringing the ear 751 of the latter link into the path of movement of the upper end of the lever 743, further movement of the lever 743 bringing the top end thereof into engagement with said ear and rocking the shaft 728 to stop the machines, as hereinbefore described.

The function of the roller 738 is to descend into the space between the plates 736 at that time during each card feed cycle at which a card should be passing between said plates and beneath said roller on its way to the punch chamber. If the roller fails to sense a card and moves downward into the slot in the lower plate 736, the operation is as just above described. However, if a card is passing beneath the roller, its downward motion is checked and the ear 751 does not move down into the path of lever 743 and the machines are not stopped.

The means whereby the roller 738 is allowed to operate only on those cycles in which a card is to be fed, and on these cycles only at the times at which a card should be passing therebeneath, will now be described.

Below its pivot the lever 743 (Fig. 13) carries a follower roller 752 pressed by a spring 753 against a cam 754 on the front drive shaft 141 of the machine. The cam 754 is concentric for the greater portion of its periphery, but has a cut-out in which the roller 752 can ride for that portion of the cycle during which a card is passing beneath the roller 738, which, in the present instance, is from about 80° to 160°. To prevent the roller 752 from following the periphery of cam 754 on those cycles during which a card is not fed, the lever 743 is continued past the roller 752 and carries a stud 755 engaged by an arm 756 fast on the card picker shaft 401.

Thus, when on a card feeding cycle the picker shaft 401 rocks at about 8° to feed a card into the punch chamber, the roller 752 is freed to follow the periphery of cam 754. When at about 80° the roller 752 enters the notch of said cam, the lever 743 will move clockwise about its pivot and the bell-crank 740 will follow it under tension of the spring 741, allowing the sensing roller 738 to move downward. The operation from this point onward would then be as described above.

When a machine is stopped by the just described mechanism it would not be sufficient merely to clear up whatever trouble caused said stoppage and then restart the machines, but it is necessary to

*First.*—Free the card feed mechanism from the restraint of latch 407 (Fig. 19) to permit of the feeding of a card into the punch chamber;

*Second.*—Prevent operation of the set pin retract mechanism which otherwise would clear the data to be punched in the card at about 125° of the first punch cycle. This is required, due to the fact that the card into which said data is to be punched does not fully enter the punch chamber until about 258° of said first punch cycle, and the set pin unit does not move down to push the punches through said card until about 15° of the following cycle;

*Third.*—Start the punch alone for one or more cycles in order to feed a card into the chamber and permit the operator at the completion of said one or more cycles to enable the retract mechanism and the card feed latches. The reason one or more cycles is specified is that in the event of a card jam, several cycles may be needed to clear up the jam; and

*Fourth.*—Set the first card designation releasing bar control mechanism to operate the releasing bar and free the designation gag bars only on the first cycle of combined punch and tabulator operation.

The means to these ends will now be described.

A lever 757 of the first order, pivoted to the framing at 758 and biased clockwise in Fig. 13 by a spring 760, has at its upper end a flattened surface 761 engaged by the pin 746 in the link 745, and has at its lower end a similar surface 762 contacting a pin 763 in an arm 764 fast on a transverse rock shaft 765.

The shaft 765 also has fast thereon another arm 770 (Figs. 5 and 14) which carries studs 771, one on either side of the arm, each said stud being located in the same plane as, but normally out of the path of an arm 772 fixed on the rock shaft 471 or the rock shaft 472. The shafts 471 and 472, it will be remembered, are rocked counter-clockwise in Fig. 14 to enable the hooks 463, and thereby, the retract mechanism, the former between 158° and 175° of both total and grand total cycles, and the latter at the same time during grand total cycles only.

The construction is such that when the shaft 765 is rocked between 80° and 120° of a total or grand total cycle, as described hereinbefore, the studs 771 are moved into the paths of movement of the arms 772 and lock the shafts 471 and 472 in substantially their normal positions with the hooks 463 disengaged and the retract mechanism disabled. When at about 124° of cycle the spring 503 (Fig. 14) begins to pull the slide 484 downward and thereby to rock the shafts 471 and 472, the arms 772 engage the studs 771 and the slide moves only a short distance down and the retract mechanism remains disabled. The slight downward movement of slide 484 is insufficient for the latch noses 516 to pass the tripping studs 517 so that when the punch stops at the end of the cycle the latches 510 are engaging the noses 507 and holding the hooks 482 in engagement with the studs 481; and said latches remain effective until arm 770 rocks back to normal position and frees the shafts 471 and 472.

In order to maintain shaft 765 and arm 770 in the positions to which they are rocked by lever 757 said shaft has fixed thereon, a bell-crank 773 biased counter-clockwise in Fig. 5 by a spring 774. The horizontal arm of said bell-crank has at its forward end a shoulder 775 to engage an ear 776 on the depending arm of a bell-crank 777 pivoted to the framing at 778 and biased counter-clockwise by a spring 780. The counter-clockwise movements of bell-crank 773 are limited by a second shoulder 768 in the horizontal arm thereof engaging the ear 776.

The horizontal arm of bell-crank 777 carries a pin playing in a slot in the lower end of a link 782, supported at its upper end on a hand settable lever 783 pivoted to the framing at 784 and urged clockwise by a spring 785 against a limit stud 786. Forward of its pivot this lever extends through a slot in a sheet metal plate 787 fastened to the framing. The slot in the plate 787 is made of double width for the middle third of its length, so that the lever 783 may be moved downward and sideways from its normal position in the top of the slot into said widened portion where said lever is held against the tension of spring 785. The slot is continued downward beyond said widened portion to provide a third position to which said lever may be moved, as presently will be described.

When the punch is stopped because of a card feed failure, the operator moves the lever 783 into its middle position which, as presently to be explained, frees the card feed from its latches and conditions the punch for continuous operation. The operator then pushes the finger button 385 (Fig. 3), causing the punch to run for one or more cycles during which a card is fed into the punch chamber. To stop the punch the operator restores lever 783 to its normal upper position. When the machine has stopped the operator moves the lever 783 into its lowermost position which raises the link 782 and rocks the bell-crank 777 freeing shoulder 775 and allowing shaft 765 to rock back to normal position. At the same time moving the lever 783 to its lowermost position conditions control means to release the designation type bar slides on the next cycle, as presently will be described.

The restoration of shaft 765 to normal frees shafts 471 and 472 and allows spring 503 (Fig. 14) to pull slide 484 downward which through the still engaged hook or hooks 482 rocks either or both of the shafts 471 and 472. This allows the springs 465 (Fig. 13) to rock either or both of the hooks 463 into engagement with their lever fingers 462 so that when cam 461 rocks lever 457 between 114° and 125° of the following cycle (that is, the first cycle of combined punch and tabulator operation) either or both of the retracting bars 438 and 440 are operated to retract the set up in the set pins 165, which set up had been punched in the card at about 15° of the same cycle. While retract cam 461 is holding the lever 457 and, therefore, the hooks 463 in fully operated position, at between 124° and 132° of cycle the cam 504 raises slide 484, tripping the latches 510 and allowing the hook or hooks 462 to become disengaged from the studs 401 when the slide reaches its highest point at about 150°. This does not disengage the hooks 463, however, due to the frictional engagement thereof with the fingers 462. Said hooks do become disengaged when the retract cam 461 allows lever 457 to rock back to normal position between 180° and 195° and such frictional engagement is relieved. The mechanism is then fully restored to normal.

As soon as the manual pressure holding the lever 783 (Fig. 5) in its lowermost position is relieved, said lever snaps up to its uppermost position and the machine is normalized, ready to be started with the tabulator.

The means whereby the card feed latch is tripped by the lever 783 and the punch is conditioned for continuous operation, will now be described.

Pivoted on the same stud 784 as the lever 783 is a bell-crank 790 (Fig. 5) tensioned counter-clockwise by a spring 791, but prevented from moving in that direction by a hook 792 on the upper edge of lever 783 which engages a stud 793 in the upper arm of said bell-crank. The stud 793 underlies the arm 410 (see also Fig. 19) which by shaft 408 is rigidly connected with the card feed latch 407, as hereinbefore described.

The construction is such that when the lever 783 (Fig. 5) is moved to its middle position the hook 792 moves upward, allowing the spring 791 to rock the bell-crank 790 which through stud 793 rocks the arm 410 to trip the latch 407 and allow a card to be fed.

It is evident that when the lever 783 is allowed to snap back to its uppermost position this unlatching mechanism is normalized and no' card will be fed into the punch chamber during the next cycle of the punch, which is the first card designation cycle.

To condition the punch for continuous operation the upper end of interponent 374 (Fig. 19) has a stud engaged in a slot in the lower end of an arm 788 fast on a stub shaft 789, said shaft at its other end having secured thereon an arm 869 connected by pin and slot with the card feed link 412. The construction is such that when the lever 783 (Fig. 5) is moved to its mid position and frees the card feed as just above described, the link 412 is raised rocking shaft 789 counter-clockwise in Fig. 19. This, through arm 788 moves the shoulder 375 of interponent 374 out of the path of lifter 376 so that the latter is ineffective to stop the machine, which once started by means of finger button 385, runs continuously. When the lever 783 is restored to normal, shoulder 375 moves back into the path of lifter 376 and the machine is stopped at the end of the cycle.

As described hereinabove when the machines are stopped automatically at the end of a total or grand total cycle, the slide 616 (Fig. 22) is held in its operated position by stud 617 engaging the upward extension 622 of slot 621 so that the Bowden 360 initiates an operation of the designation releasing bars 308 on the first cycle of the punch after restarting. However, when the machines are stopped by the misfeed mechanism this mode of operation would result in the releasing bars 308 being operated inopportunely on the first of the additional card feeding cycles of the punch. To prevent this, means actuated by the misfeed mechanism are provided to effect restoration of slide 616 in time to prevent an operation of the Bowden 360, and other means are provided to effect an operation of the releasing bars 308 at the appropriate time.

The former of these means includes an arm 802 fast on the right hand end of rock shaft 765 (Fig. 22) which it will be remembered is rocked clockwise in Fig. 22 by the operation of the misfeed mechanism between 80° and 120° of a total or grand total cycle, and which is locked in its rocked position by the latch 773 (Fig. 5). The free end of arm 802 is connected by a link 803 with one end of a lever 804 of the first order pivoted on a post 805 projecting from the frame plate 613, said lever having in its other end a stud 806 which extends beneath the slide 616 near the forward end of the latter.

The construction is such that when the shaft 765 is rocked between 80° and 120° of a total or grand total cycle, the stud 806 raises the front end of slide 616 so that the upward extension 622 of slot 621 is moved above stud 617. Thus when the stopping of the tabulator restores the Bowden 594 at about 330° of punch cycle the slide 616 is restored to normal position by spring 626, and the Bowden 360 is not actuated. Thus the designation releasing bars are not operated on the extra card feeding cycle or cycles of the punch.

The means whereby the releasing bars 308 are operated on the first joint cycle of the punch and tabulator will now be described.

Below the lever 783, a short distance forward of its pivot (Fig. 5), stands the plunger of a Bowden 794 having its casing anchored in familiar fashion to a bracket 795 fastened to the framing of the machine. This Bowden extends up to the head of the punch where (Fig. 12) it is anchored in a bracket 796, pivoted at 798 on plate 362 with its plunger standing normally beneath an ear 797 of the designation bell-crank 366 hereinbefore described. Bracket 798 is held in its normal position with a limit stud 799 therein against one side of a hole 800 in plate 362 by a spring 801.

The construction is such that when the lever 783 (Fig. 5) is moved down to its lowermost position following the card feeding cycle of the punch it actuates the Bowden 794, which rocks the bell-crank 366 (Fig. 12) and depresses the arm 348 which is latched down by arm 354. Thus, the punch is conditioned to pick up the designation during the next cycle which is initiated by depressing the tabulator palm key 122 and starts both machines, as hereinbefore described.

If the machines are stopped by the misfeed mechanism at the end of a total cycle which is to be followed by a grand total cycle, then the first joint cycle of the machines will be the grand total cycle, not the designation cycle. In this situation the Bowden 794 (Figs. 5 and 12) just above described would, unless otherwise controlled, effect an inopportune operation of the designation releasing bars 308 on the grand total cycle. To prevent this the following means are provided:

The Bowden 655 (Fig. 22) which as described hereinbefore is actuated by ear 657 between 310° and 330° of those total cycles of the punch which are to be followed by grand total cycles, extends up to the head of the punch (Fig. 12) and has its casing secured to an ear 807 of plate 362. The plunger of the Bowden underlies an ear 808 formed on one arm of a bell-crank 810 whose other arm abuts the edge of bracket 796 below its pivot 798.

The construction is such that when Bowden 655 is actuated between 310° and 330° of the total cycle it rocks bracket 796 and moves Bowden 798 to a position wherein ear 797 is out of range thereof. When the machines stop the grand total shaft 551 remains in operated position so that when during the extra card feeding cycle or cycles of the punch the ear 657 (Fig. 22) moves back to inactive position restoring the Bowden 655, the still active Bowden 659 maintains Bowden 655 in position to be actuated again by ear 657 when the latter moves to active position between 310° and 330° of each said extra cycle. Thus, at the end of the last extra punch cycle the Bowden 794 is again out of range of ear 797 (Fig. 12), and when said Bowden is actuated momentarily by moving lever 783 (Fig. 5) to its lowermost position as described hereinbefore, it does not affect said ear 797 and the releasing bars 308 are not operated.

When the machines are started in proper unison again the operation is the same as that for a simple grand total operation, that is to say, the slide 616 is moved forward by Bowden 594 and so on.

*Synchronization of tabulator and punch*

According to the invention, means also are provided automatically to stop both machines if they run too far out of synchronism with one another.

To this end the tabulator stop shaft 710 has secured thereon a depending arm 811 which has projecting laterally from its lower end a housing cylinder 812 for a pin 813 (Fig. 22). At one end the pin 813 projects through arm 811 and is provided with a wide flat head 814, and at its other end the pin projects from cylinder 812 and has fast thereon a thick sleeve or collar 815. A spring mounted in familiar fashion within housing 812 serves to tension the collar 815 against the housing 812 in which position said collar is in the path of movement of the plunger of a Bowden 816 whose casing is secured to a suitable bracket 817. The sleeve 815 is moved out of the path of the plunger of Bowden 816 by a second Bowden 818 whose casing is secured to a rearward extension of bracket 817 and whose plunger acts on the head 814 of pin 812.

The construction is such that if the Bowden 816 is actuated while the collar 815 is in the path of its plunger, the arm 811 and, therefore, the shaft 710 are rocked and the machines stop as described hereinabove. However, if at the time Bowden 816 is actuated the Bowden 818 is holding collar 815 out of the path of the former's plunger, then said plunger does not affect shaft 710 and the machines continue to run.

In the present instance the Bowden 816 is actuated by timed means in the tabulator and the Bowden 818 by timed means in the punch, such means being adapted, when the machines are properly synchronized to maintain the Bowden 818 actuated for a definite period of time and to actuate the Bowden 816 during such time period. Thus, so long as the machines are in proper synchronism the Bowden 816 is ineffective to stop them. The amount of time which the actuated period of Bowden 818 overlaps that of Bowden 816, of course, measures the degree of precision to which the machines are synchronized, and the amount of such overlapping is determined by the closeness of the relative timing of the several cooperating components of the machines. As will presently appear the present machines are controlled so as to stop only when they become further than approximately 20° out of ideal synchronization in either direction.

The Bowden 816 is actuated (Figs. 15 and 22) by an ear 820 at one end of a follower lever 821 pivoted at 822 on a bracket 823 and having at its other end a roller 824 pressed by a spring 825 against the periphery of the tabulator stop cam 709. As shown on the time chart cam 709 maintains Bowden 816 actuated from about 172° to 180° of punch cycle which is about 142° to 150° of tabulator cycle.

The Bowden 818 extends over to the right hand side of the punch where its casing is secured to an ear of a plate 826 adjustably mounted on the frame plate 613 hereinabove described. The Bowden is actuated by an ear 827 of a follower lever 828 pivoted at 830 on plate 613 and carrying a roller 831 pressed by a spring 832 against the periphery of a cam 833 on the rear drive shaft 142 of the punch. As shown by the time chart cam 833 maintains the Bowden 818 actuated from about 150° to 202° of punch time.

The construction is such that Bowden 818 holds the 815 out of range of Bowden 816 for about 52° of each punch cycle, whereas the Bowden 816 is actuated for only about 8° of each tabulator cycle. Thus the machines must become more than 20° out of the ideal synchronization shown on the time chart before the Bowden 816 can act to stop them. It will be realized, of course, that under different machine timing conditions this leeway would not be 20°, but would be a different amount.

As described hereinabove the punch does not run continuously, but rather runs only at each total or grand total operation of the tabulator. Therefore, in order to maintain the collar 815 out of range of Bowden 816 while the punch is not running to prevent said Bowden from stopping the tabulator, the cam 833 is provided with a hump 834 which, as shown in Fig. 22, engages the roller 831 and maintains the Bowden 818 actuated when said cam is in its stop position.

While there is above described but one embodiment of the invention, it is possible to produce still other embodiments without departure from the inventive concept above disclosed, and it is, therefore, desired that only such limitations shall be imposed on the appended claims as are stated therein, or required by the prior art.

What we claim as new, and desire to secure by Letters Patent, is:

1. In a machine of the class described the combination of a plurality of positioning slides advanced differentially, a plurality of step sectors, one pushed to a set position by each positioning slide, a restoring bar for the step sectors, and a plurality of spring urged pins carried by the restoring bar, one pressed against each step sector as the latter advances, to prevent overthrow thereof past said set position.

2. In a combined summary punch and tabulator the combination of a plurality of type bars advanced differentially, a plurality of positioning slides advanced differentially in accordance with the settings of the type bars, a plurality of step sectors, one pushed to a set position by each of said positioning slides, a restoring bar for the step sectors, and a plurality of spring urged pins carried by the restoring bar, one pressed against each step sector as the latter advances, to prevent overthrow thereof past said set position.

3. In a combined summary punch and tabulator the combination of a plurality of type bars advanced differentially, a plurality of positioning slides advanced on each cycle of the punch, means actuated by each positioning slide to sense the setting of a type bar and limit the advance of the positioning slide, a step sector advanced by each positioning slide, a plurality of gag bars advanced selectively on selected cycles of the punch to sense the settings of the step sectors, a set-pin storage unit set up in accordance with the settings of the gag bars and including a plurality of means selectively settable to erase all or a part of the set up of the storage unit, each of said means being operated on selected cycles of the punch under control of the tabulator.

4. A set-pin storage unit for a machine of the class described comprising a plurality of columns of selectively settable set-pins, a slide for each column of set-pins to lock in set position any pin that has been set, a plurality of bars operated selectively to move the slides to unlocking positions, and settable means for connecting each slide with either bar to be moved to unlocking position thereby.

5. A set-pin storage unit for a machine of the class described comprising a plurality of columns of selectively settable set-pins, a slide for each column of set-pins to lock in set position any pin that has been set, a plurality of bars to move said slides to unlocking positions, settable means for connecting each slide with either bar to be moved to unlocking position thereby, normally disabled operating means for each said bar and control means for enabling said operating means selectively.

6. In a combined summary punch and tabulator the combination of a plurality of type bars advanced differentially, a plurality of positioning slides advanced on each cycle of the punch, means actuated by each positioning slide to sense the setting of a type bar and limit the advance of the positioning slide, a plurality of gag bars advanced selectively on selected cycles of the machine, a set-pin unit including a plurality of columns of set-pins set in accordance with the settings of the gag bars, and a locking slide for each column to lock the set-pins in set position, a plurality of bars to move said slides to unlocking position, means settable to connect each slide with either bar to be moved thereby to unlocking position, normally disabled means for operating each said bar and means under control of the tabulator to enable said bar operating means selectively.

7. In a combined summary punch and tabulator the combination of a plurality of type bars advanced differentially, a plurality of positioning slides advanced on each cycle of the punch, means actuated by each positioning slide to sense the setting of a type bar and limit the advance of the positioning slide, a plurality of gag bars advanced selectively on selected cycles of the machine, a set-pin unit including a plurality of columns of set-pins set in accordance with the settings of the gag bars, and a locking slide for each column to lock the set-pins in set position, a plurality of bars to move said slides to unlocking position, means settable to connect each slide with either bar to be moved thereby to unlocking position, a lever to operate each said bar, a power driven member, a plurality of hooks carried by said member and normally disengaged from said levers, and means controlled by the tabulator for engaging said hooks with their levers selectively.

8. In a combined summary punch and tabulator the combination of a plurality of type bars advanced differentially, a plurality of positioning slides advanced on each cycle of the punch, means actuated by each positioning slide to sense the setting of a type bar and limit the advance of the positioning slide, a plurality of gag bars advanced selectively on selected cycles of the machine, a set-pin unit including a plurality of columns of set-pins set in accordance with the settings of the gag bars, and a locking slide for each column to lock the set-pins in set position, a plurality of bars to move said slides to unlocking position, means settable to connect each slide with either bar to be moved thereby to unlocking position, a lever to operate each said bar, a power driven member, a plurality of hooks carried by said member and normally disengaged from said levers, total, and grand total control means to engage said hooks with their lever selectively.

9. In a combined summary punch and tabulator the combination of a plurality of type bars advanced differentially, a plurality of positioning slides advanced on each cycle of the punch, means actuated by each positioning slide to sense the setting of a type bar and limit the advance of the positioning slide, a plurality of gag bars advanced selectively on selected cycle of the machine, a set-pin unit including a plurality of columns of set-pins set in accordance with the settings of the gag bars, and a locking slide for each column to lock the set pins in set position, a plurality of bars to move said slides to unlocking position, means settable to connect each slide with either bar to be moved thereby to unlocking position, normally disabled means for operating each said bar and total and grand total control means to enable said bar operating means selectively.

10. In a machine of the class described the combination of a plurality of rows of individually settable set-pins, a locking slide for each row of pins to lock in set position any pin that has been set, a pair of bars each to move the locking slides to unlocking position, settable means to connect each said slide with either of said bars, a lever to operate each said bar, a power driven actuator, a pair of hooks carried by said actuator to operate said levers but normally out of engagement therewith, a lock to hold each said hook out of engagement and means to trip said locks selectively.

11. In a machine of the class described the combination of a plurality of rows of individually settable set-pins, a locking slide for each row of pins to lock in set position any pin that has been set, a pair of bars each to move the locking slides to unlocking position, settable means to connect each said slide with either of said bars, a lever to operate each said bar, a power driven actuator, a pair of hooks carried by said actuator to operate said levers but normally out of engagement therewith, a lock to hold each said hook out of engagement and a selectively operable trip for each said lock.

12. In a summary punch controlled by a tabulator the combination of a plurality of rows of individually settable set-pins a locking slide for each row of pins to lock in set position any pin that has been set, a pair of bars each to move the locking slides to unlocking position, settable means to connect each said slide with either of said bars, a lever to operate each said bar, a power driven actuator, a pair of hooks carried by said actuator to operate said levers but normally out of engagement therewith, a lock to hold each said hook out of engagement, a normally disabled trip for each said lock, and an enabler for each said trip operated selectively by the tabulator.

13. In a machine of the class described the combination of a plurality of rows of individually settable set-pins, a locking slide for each row of pins to lock in set position any pin that has been set, a pair of bars each to move the locking slides to unlocking position, settable means to connect each said slide with either of said bars, a lever to operate each said bar, a power driven actuator, a pair of hooks carried by said actuator to operate said levers but normally out of engagement therewith, a lock to hold each said hook out of engagement, a selectively operable trip for each said lock, means automatically to interrupt the operation of the machine, and a member operated by said interrupting means to block action of either said trip.

14. In a combined summary punch and tabulator the combination of total and grand total control means, card punching means, a data storing set-pin unit for actuating said punching means, and a plurality of normally disabled means each for erasing all or a part of the data stored in the set pin unit, enabled selectively by said total and grand total control means.

15. In a combined summary punch and tabular the combination of total and grand total control means, card punching means, a data storing set-pin unit for actuating said punching means, and a plurality of normally disabled retract bars enabled selectively by said total and grand total control means, each to erase all or a part of the data stored in the set pin unit.

16. In a machine of the class described the combination of a gag bar advanced from a normal position to positions representative of the numerals 0–9, a step sector having stops to limit the advance of the gag bar to one of said positions 0–9, and an interponent carried by the step sector and settable between the zero stop of the latter and the gag bar to prevent advance of said bar to zero position.

17. In a machine of the class described the combination of a step sector having steps representative of the numerals 0–9 of which the zero step is normally in a stopping position, a gag bar advanced from a normal position to positions representative of the numeral 0–9 as determined by the step of the step sector in stopping position, and an interponent carried by the step sector and settable to prevent advance of the gag bar to zero position when the zero step is in stopping position.

18. In a machine of the class described the combination of a gag bar advanced from a normal position to positions representative of the numerals zero to nine, a step sector having steps settable in the path of the gag bar to determine the position to which the latter advances, the zero step of the step sector normally standing in the path of the gag bar, and an interponent carried by said step sector and interposable between the zero step and the gag bar to prevent advance of the latter to zero position when the zero step is in the path of the gag bar.

19. In a machine of the type described, the combination of a gag bar advanced from a normal position to positions representative of the numerals zero to nine, a step sector having a zero step normally in the path of the gag bar to limit the advance of the latter to zero position and having other steps settable in the path of the gag bar to limit the advance of the latter to its other positions, and an interponent carried by the step sector and interposable between the zero step and the gag bar to prevent advance of the latter to zero position when the zero step is in the path thereof.

20. In a machine of the type described, the combination of a gag bar advanced from a normal position to positions representative of the numerals zero to nine, a step sector having a zero step normally in the path of the gag bar to limit the advance of the latter to zero position and having other steps settable in the path of the gag bar to limit the advance of the latter to its other positions, and an interponent carried by the step sector and interposable between the zero step and the gag bar to prevent advance of the latter to zero position when the zero step is in the path thereof, said interponent moving out of the path of the gag bar when one of the other steps is moved into the path thereof.

21. In a machine of the class described the combination of a plurality of normally locked gag bars, a releasing bar to free certain of said gag bars, means to operate said releasing bar including an actuator and an interponent normally in ineffective position, a member to move said interponent to effective position, a first control means to actuate said member, means to interrupt the operation of the machine and disable said first control means, manually settable means to condition the machine for reoperation, a connector actuated by said settable means and in turn actuating said member, and a second control means actuated prior to the interruption of the operation of the machine to move said connector to a position in which it is ineffective to actuate said member.

22. In a combined summary punch and tabulator the combination of type bars advanced differentially some on one cycle to print a total and others on a later cycle to print other data, normally locked gag bars advanced differentially in accordance with the settings of the type bars, normally disabled means for releasing certain gag bars to advance in accordance with the type bars set to print the total, normally disabled means for releasing other gag bars to advance in accordance with the type bars set to print said other data, control means actuated preparatory to printing the total to enable the first said releasing means, and means for enabling the other of said releasing means including a latch tripped by said control means, an interponent held normally in ineffective position by said latch, and a timed actuator acting through said interponent to operate said enabling means preparatory to the printing of said other data.

23. In a combined summary punch and tabulator the combination of type bars advanced differentially some on one cycle to print a total and others on a later cycle to print other data, normally locked gag bars advanced differentially in accordance with the settings of the type bars, normally disabled means for releasing certain gag bars to advance in accordance with the type bars set to print the total, normally disabled means for releasing other gag bars to advance in accordance with the type bars set to print said other data, control means actuated preparatory to printing the total to enable the first said releasing means, means for enabling the other of said releasing means including a latch tripped by said control means, an interponent held normally in ineffective position by said latch and a timed actuator acting through said interponent to operate said enabling means preparatory to the printing of said other data, means to interrupt the operation of the machines preparatory to printing said other data, said interrupting means effecting restoration of said control means, a lock to hold said latch in tripped condition until the operation is resumed and a trip for said lock operated by said timed actuator.

24. In a combined summary punch and tabulator the combination of type bars advanced differentially some on one cycle to print a total and others on a later cycle to print other data, normally locked gag bars advanced differentially in accordance with the settings of the type bars, normally disabled means for releasing certain gag bars to advance in accordance with the type bars set to print the total, normally disabled means for releasing other gag bars to advance in accordance with the type bars set to print said other data, control means actuated preparatory to printing the total to enable the first said releasing means, means for enabling the other of said releasing means including a latch tripped by said control means, an interponent held normally in ineffective position by said latch, and a timed actuator acting through said interponent to operate said enabling means preparatory to the printing of said other data, means to interrupt the operation of the machines preparatory to printing said other data, said interrupting means effecting restoration of said control means, a lock to hold said latch in tripped condition, a trip for said lock operated by said interrupting means, hand settable means for conditioning the machine for reoperation, and an operating member actuated by said hand settable means to enable the other said releasing means.

25. In a combined summary punch and tabulator the combination of type bars advanced differentially some on successive cycles to print a total and a grand total, and others on a later cycle to print other data, normally locked gag bars advanced differentially in accordance with the settings of the type bars, normally disabled means for releasing certain gag bars to advance in accordance with the type bars set to print the total and the grand total, normally disabled means for releasing other gag bars to advance in accordance with the type bars set to print said other data, control means actuated preparatory to printing the total and again preparatory to printing the grand total to enable the first said releasing means, and means for enabling the other of said releasing means including a latch tripped by said control means, an interponent held normally in ineffective position by said latch, a timed actuator temporarily to restore the interponent to ineffective position independently of the latch preparatory to printing the grand total, and a second timed actuator acting through said interponent to operate said enabling means preparatory to the printing of said other data.

26. In a combined summary punch and tabulator the combination of type bars advanced differentially some on successive cycles to print a total and a grand total, and others on a later cycle to print other data, normally locked gag bars advanced differentially in accordance with the settings of the gag bars, normally disabled means for releasing certain gag bars to advance in accordance with the type bars set to print the total and the grand total, normally disabled means for releasing other gag bars to advance in accordance with the type bars set to print said other data, control means operated preparatory to printing the total and again preparatory to printing the grand total to enable the first said releasing means, means for enabling the other of said releasing means including a latch tripped by said latch, a timed actuator temporarily to restore the interponent to ineffective position independently of the latch preparatory to printing the grand total, and a second timed actuator acting through said interponent to operate said enabling means preparatory to the printing of said other data, means to interrupt the operation of the machines preparatory to printing the grand total, manually settable means to condition the machines for reoperation, an operating member actuated by said settable means to enable the other said releasing means, and a second operating member operated by the first said timed actuator prior to the interruption of the operation of the machines to disable the first said operating member.

27. Means for preventing the dissynchronizing of a tabulator and a cooperating summary punch each having its own driving means, which includes a stop member operated to stop both machines, an interponent associated with said member, a timed actuator in each machine, one to operate said member through said interponent and the other to move the interponent to a position where it is not affected by the first.

28. Means for preventing the dissynchronizing of a tabulator and a cooperating summary punch each having its own driving means, which includes a stop member operated to stop both machines, an interponent associated with said stop member, a timed actuator in one machine to operate said stop member through said interponent, and a timed actuator in the other machine to move said interponent out of range of the first said timed actuator and prevent operation of said stop member.

29. Means for preventing the dissynchronizing of a tabulator and a cooperating summary punch each having its own driving means, which includes a stop member operated momentarily to stop both machines, an interponent associated with said stop member, a timed actuator in one machine advanced momentarily to operate said member through said interponent, and an actuator in the other machine timed to maintain said interponent out of range of the first mentioned actuator during the advance of the latter.

30. Means for preventing the dissynchronizing of a tabulator and a cooperating summary punch each having its own driving means, which includes a stop member operated momentarily to stop both machines, an interponent associated with said stop member, a timed actuator in one machine advanced momentarily to operate said member through said interponent, and an actuator in the other machine timed to maintain the interponent out of range of the first mentioned actuator for a period of time overlapping the momentary advance of the latter in either direction.

31. Means for preventing the dissynchronizing of a continuously operating tabulator and an intermittently operating summary punch each having its own driving means, which includes a stop member momentarily operated to stop both machines, an interponent associated with said stop member, a timed actuator in the tabulator momentarily to operate said stop member through said interponent on each cycle, and an actuator in the punch to maintain said interponent out of range of the first said actuator for that portion of each cycle during which the latter operates and also while the punch is not operating.

32. In a combined tabulator and summary punch, the combination of a type-bar, a reading lever to sense the position of said type-bar, a positioning slide connected with sensing finger, a step-sector set differentially by said positioning slide, a punch selecting bar set under control of said set sector, a restoring bar acting to restore said reading finger and said positioning slide leaving the step sector in set position, and a restoring bar acting afterward to restore said step sector.

FREDERICK A. SHULTZ.
FLOYD C. GRESSEL.
OSCAR J. HOBB.
GUSTAV H. KROEGER.

REFERENCES CITED

The following references are of record in the file of this patent:

UNITED STATES PATENTS

| Number | Name | Date |
|---|---|---|
| 2,354,549 | Rindfleisch | July 25, 1944 |